United States Patent
Yamamoto et al.

(10) Patent No.: US 6,943,922 B2
(45) Date of Patent: Sep. 13, 2005

(54) IMAGE READING METHOD AND APPARATUS FOR SAME

(75) Inventors: Tetsuichiro Yamamoto, Tokyo (JP); Kouji Nakahara, Tokyo (JP)

(73) Assignee: NEC Corporation, Tokyo (JP)

(*) Notice: Subject to any disclaimer, the term of this patent is extended or adjusted under 35 U.S.C. 154(b) by 848 days.

(21) Appl. No.: 09/840,910

(22) Filed: Apr. 25, 2001

(65) Prior Publication Data

US 2002/0063785 A1 May 30, 2002

(30) Foreign Application Priority Data

Apr. 25, 2000 (JP) ........................................ 2000-124066
Mar. 30, 2001 (JP) ........................................ 2001-102719

(51) Int. Cl.[7] ............................. H04N 1/04; H04N 1/32; H04N 1/46; H01N 27/00
(52) U.S. Cl. ..................... 358/474; 358/468; 358/482; 358/505; 358/483; 358/494; 250/208.1
(58) Field of Search ................................ 358/474, 468, 358/482, 505, 483, 494, 514, 513; 250/208.1

(56) References Cited

U.S. PATENT DOCUMENTS 4,558,357 A * 12/1985 Nakagawa et al. ......... 358/514
5,340,977 A * 8/1994 Kojima et al. ............. 250/208.1
5,920,063 A * 7/1999 Kawamoto et al. ........ 250/208.1
6,335,805 B1   1/2002 Ishiguro et al.

FOREIGN PATENT DOCUMENTS

JP          9-163100       6/1997
JP          10-178513      6/1998

* cited by examiner

Primary Examiner—Edward Coles
Assistant Examiner—Houshang Safaipour
(74) Attorney, Agent, or Firm—Foley & Lardner LLP

(57) ABSTRACT

An image reading apparatus is provided which is capable of reading an original document at a higher speed. M pieces of lines on the surface of the original document can be simultaneously read by M pieces of line-like strings of light sensing devices making up a CCD (Charge-Coupled Device) having an interval represented by N pieces of lines to be read. When simultaneous reading is completed, the original document is moved to a line existing apart by L pieces of lines from the lines that have been read. While the original document is moving, image signals of lines that have been read are A/D (analog to digital) converted and then stored to memory regions. Simultaneous reading operation and subsequent storing are sequentially performed on lines on which the line-like strings of light sensing devices are placed.

21 Claims, 16 Drawing Sheets

FIG. 7

| | | interval among line-like strings of light sensing devices "N" (N being expressed by numbers of reading lines) | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| numbers of line-like strings of light sensing devices "M" | 2 | × | × | ○ | ○ | ○ | ○ | ○ | ○ | ○ | ○ | ○ | ○ | ○ | ○ | ○ | ○ |
| | 3 | × | × | × | ○ | ○ | ○ | ○ | ○ | ○ | ○ | ○ | ○ | ○ | ○ | ○ | ○ |
| | 4 | × | × | × | × | ○ | ○ | ○ | ○ | ○ | ○ | ○ | ○ | ○ | ○ | ○ | ○ |
| | 5 | × | × | × | × | × | ○ | ○ | ○ | ○ | ○ | ○ | ○ | ○ | ○ | ○ | ○ |
| | 6 | × | × | × | × | × | × | ○ | ○ | ○ | ○ | ○ | ○ | ○ | ○ | ○ | ○ |
| | 7 | × | × | × | × | × | × | × | ○ | ○ | ○ | ○ | ○ | ○ | ○ | ○ | ○ |
| | 8 | × | × | × | × | × | × | × | × | ○ | ○ | ○ | ○ | ○ | ○ | ○ | ○ |
| | 9 | × | × | × | × | × | × | × | × | × | ○ | ○ | ○ | ○ | ○ | ○ | ○ |
| | 10 | × | × | × | × | × | × | × | × | × | × | ○ | ○ | ○ | ○ | ○ | ○ |

FIG.11

| | | interval among line-like strings of light sensing devices "N" (N being expressed by numbers of reading lines) | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| numbers of line-like strings of light sensing devices "M" | 2 | O | X | O | X | O | X | O | X | O | X | O | X | O | X | O | X |
| | 3 | O | O | X | O | O | X | O | O | X | O | O | X | O | O | X | O |
| | 4 | O | X | O | X | O | X | O | X | O | X | O | X | O | X | O | X |
| | 5 | O | O | O | O | X | O | O | O | O | X | O | O | O | O | X | O |
| | 6 | O | X | X | X | O | X | O | X | X | X | O | X | O | X | X | X |
| | 7 | O | O | O | O | O | O | X | O | O | O | O | O | O | X | O | O |
| | 8 | O | X | O | X | O | X | O | X | O | X | O | X | O | X | O | X |
| | 9 | O | O | X | O | O | X | O | O | X | O | O | X | O | O | X | O |
| | 10 | O | X | O | X | X | X | O | X | O | X | O | X | O | X | X | X |

FIG.15

| | | interval among line-like strings of light sensing devices "N" (N being expressed by numbers of reading lines) | | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| numbers of line-like strings of light sensing devices "M" | 2 | ○ | × | ○ | × | ○ | × | ○ | × | ○ | × | ○ | × | ○ | × | ○ | × |
| | 3 | ○ | ○ | △ | ○ | ○ | × | ○ | ○ | △ | ○ | ○ | × | ○ | ○ | △ | ○ |
| | 4 | ○ | △ | ○ | △ | ○ | × | ○ | △ | ○ | △ | ○ | × | ○ | △ | ○ | △ |
| | 5 | ○ | ○ | ○ | ○ | △ | ○ | ○ | ○ | △ | ○ | ○ | ○ | ○ | ○ | △ | ○ |
| | 6 | ○ | △ | × | △ | ○ | △ | △ | ○ | △ | △ | ○ | △ | ○ | △ | △ | △ |
| | 7 | ○ | ○ | ○ | ○ | ○ | △ | ○ | ○ | ○ | ○ | ○ | ○ | ○ | △ | ○ | ○ |
| | 8 | ○ | △ | ○ | △ | ○ | △ | ○ | △ | ○ | △ | ○ | △ | ○ | △ | ○ | △ |
| | 9 | ○ | ○ | △ | ○ | ○ | △ | ○ | △ | ○ | ○ | △ | ○ | ○ | △ | ○ | ○ |
| | 10 | ○ | △ | ○ | △ | △ | ○ | △ | ○ | △ | ○ | △ | ○ | △ | △ | △ | △ |

IMAGE READING METHOD AND APPARATUS FOR SAME

BACKGROUND OF THE INVENTION

1. Field of the Invention

The present invention relates to an image reading method and an apparatus for the same and more particularly to the image reading method and the image reading apparatus being capable of simultaneously reading a plurality of lines to be read ("line to be read" hereinafter being referred to as a "reading line" by using a CCD (Charge-Coupled Device).

The present application claims priority of Japanese Patent Application No. 2000-124066 filed on Apr. 25, 2000, which is hereby incorporated by reference.

2. Description of the Related Art

A conventional image reading apparatus (such as a scanner) is so configured that an original document can be read by using a string of light sensing devices being placed in a line and making up a monochrome CCD having pixels the number of which is enough to receive light reflected off each of reading lines of the original document and, therefore, in order to read the entire original document by such the conventional image reading apparatus, as shown in FIG. 17, it is necessary to read each reading line of the original document, by using the string of light sensing devices, in a sub-scanning direction. FIG. 17 is a diagram explaining operations of reading the original document by using the conventional image reading apparatus. In FIG. 17, a mark "A" shows a reading line of the original document and each of marks A1, A2, . . . shows an image signal obtained by reading the reading line of the original document. Speedups in reading the original document are generally and conventionally realized by shortening time spent on scanning one reading line (hereafter referred to as a "reading time"), that is, by reducing time during which signal electrical charges are accumulated in a light receiving section within the CCD.

However, reduction of the time for accumulating the signal electrical charges leads to a decrease in amounts of stored light, thus causing adverse effects by noises or a like. In order to reduce the time for accumulating signal electrical charges without decreasing the amount of the stored light, two methods are available; one is to increase an amount of light emitted from a light source in response to a rise of a reading speed and an other is to increase a sensitivity of the CCD.

However, the above two methods have problems. If the amount of light emitted from the light source is increased in response to the rise in the reading speed, problems of an increase in power consumption and of heat production occur and therefore the method is not economical and a measure against the heat production in the light source is needed, while, if the sensitivity of the CCD has to be increased, not only the fabrication of the CCD having high sensitivity is not easy, but also use of a costly CCD is needed. Moreover, as the speed of the reading is made higher, speedup of data processing in other related circuits of the image reading apparatus is required and therefore use of high-speed circuits is needed, thus causing costs of other circuits to become high.

SUMMARY OF THE INVENTION

In view of the above, it is an object of the present invention to provide a method for reading images and an apparatus for the same which enables achievement of economical and efficient speedups of image reading.

According to a first aspect of the present invention, there is provided an image reading method for reading lines existing on a surface of an object to be read in a sub-scanning direction and for outputting image signals obtained by reading the lines, including:

a step of setting the number M of lines (M is a natural number being not less than two) that have to be simultaneously read, an interval N (N is a natural number being not less than two) among the lines that have to be simultaneously read and which is represented by reading lines and the number L of lines (L is a natural number) by which each of the reading lines moves from the line whose reading has been completed every time the simultaneous reading is completed, to a value that can avoid omission of reading lines when a sequential one reading is performed from a first reading line on the surface of the object to a last reading line on the surface of the object and to a value at which the lines to be read on the surface of the object can be all read, a step of reading the reading lines on the surface of the object by moving the lines by the number of the reading lines L in a sub-scanning direction when the simultaneous reading has been completed and by repeating the simultaneous reading on subsequent reading lines; and a step of outputting image data obtained by reading the lines to be read.

In the foregoing, a preferable mode is one wherein values M, N, and L are set to a value at which there is no omission of reading lines to be read occurring in the one time reading operation.

Also, a preferable mode is one wherein the first line to be read on the surface of the object is a line existing backward, from a first line to be normally read on the surface of the object, by predetermined numbers of lines to be read which is determined based on the values M, N, and L, in a sub-scanning direction, while the last line to be read is a line existing forward, from a last line to be normally read on the surface of the object, by predetermined numbers of lines to be read which is determined based on the values M, N, and L, in a sub-scanning direction and wherein image signals of the lines to be read are image signals of the first line to be normally read to the last line to be normally read.

According to a second aspect of the present invention, there is provided an image reading apparatus for reading lines to be read on a surface of an original document in a sub-scanning direction and outputting image signals obtained by reading the lines to be read, including:

a reading unit having light sensing devices that are able to simultaneously read M (M is a natural number being not less than two) pieces of lines to be read which are the lines to be read existing on the surface of the original document and which are different lines in the sub-scanning direction, each existing apart by N (N is a natural number being not less than two) pieces of lines in the sub-scanning direction;

a moving unit to move the original document and the reading unit, every time the lines are simultaneously read, by L (L is a natural number) pieces of the lines to be read, in the sub-scanning direction;

an image signal outputting unit to output image signals of the lines to be normally read which have been read by the reading unit in order of reading in the sub-scanning direction; and;

wherein values M, N, and L are set to a value at which lines on the surface of the original document are able to be read without omission of reading lines when simultaneous and sequential reading operations are performed from a first line to be read to a last line to be read on the surface of the original document.

In the foregoing, a preferable mode is one wherein the values M, N, and L are set so that M≧2, N≧1+M, and L=N−1.

Also, a preferable mode is one wherein the value N is set so that N=1+M.

Also, a preferable mode is one wherein the values M, N, and L are set so that M≧2, L=M, and that a greatest common measure of the values L and N equals one.

Also, a preferable mode is one wherein the values M, N, and L are set so that M≧2, 1<L≦M, and that a greatest common measure of values L and M equals one.

Also, a preferable mode is one wherein the values M and L are set so that M=L.

Also, a preferable mode is one wherein the values M and L are set so that 1<1+L<1+M.

Also, a preferable mode is one wherein the image signal outputting unit includes:

an analog/digital converting circuit to A/D (analog to digital) convert image signals of M pieces of lines to be read which have been output from the reading unit;

a storing device to store pixel data obtained by conversion by the analog/digital converting circuit; and a reading control circuit to read the pixel data stored in the storing device in order of reading in the sub-scanning direction.

Also, a preferable mode is one wherein the reading unit starts the reading operation from a line existing backward in the sub-scanning direction by the predetermined number of lines to be read that is determined based on the values M, N, and L, from a first line to be normally read and performs reading operations up to a line existing forward in the sub-scanning direction by the predetermined number of lines to be read that is determined based on the values M, N, and L and wherein the storing device stores only the pixel data obtained by reading lines to be normally read and output from the analog/digital converting circuit.

Furthermore, a preferable mode is one wherein the reading device is constructed as a color reading device, and wherein an image processing circuit for gray-level correction is provided between the storing device and the analog/digital converting circuit making up the image signal outputting unit.

With the above configurations, M pieces of reading lines, each line existing apart by N pieces of reading lines, are simultaneously read in the sub-scanning direction and, every time simultaneous reading is performed, the original document is moved by the number of reading lines L which is determined based on a relation among the values M, N, and L and which is a value that does not permit omission of the reading, the reading is made faster by M times or by times being smaller than the value M which is determined based on the relation among the values M, N, and L.

With another configuration as above, sufficiently high-speed reading of lines on the original document can be realized without shortening signal electric charge accumulating time by a line-like strings of light sensing devices making up a CCD. As a result, it is not necessary to make slow the scanning by the CCD and a higher S/N ratio can be achieved without increasing an amount of light to be emitted from a light source to the original document.

With still another configuration, since the increase in amount of light from the light source is not required, it is possible to inhibit a rise in a temperature within the image reading apparatus, thus enabling the image reading apparatus to be made compact and enabling the light source having low light emitting luminance such as an LED (Light Emitting Diode) to be made usable. Furthermore, since high-speed scanning even at a low amount of light is made possible, power consumption can be greatly reduced.

BRIEF DESCRIPTION OF THE DRAWINGS

The above and other objects, advantages, and features of the present invention will be more apparent from the following description taken in conjunction with the accompanying drawings in which:

FIG. 7 is a table showing combinations of the number of line-like strings of light sensing devices and intervals among line-like strings of light sensing devices that can be used in the image reading apparatus according to the first embodiment;

FIG. 11 is a table showing combinations of the number of line-like strings of light sensing devices and intervals among line-like strings of light sensing devices represented by numbers of reading lines in the image reading apparatus according to the second embodiment of the present invention;

FIG. 15 is a table showing combinations of the number of line-like strings of light sensing devices and intervals among line-like strings of light sensing devices represented by numbers of reading lines in the image reading apparatus according to the third embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
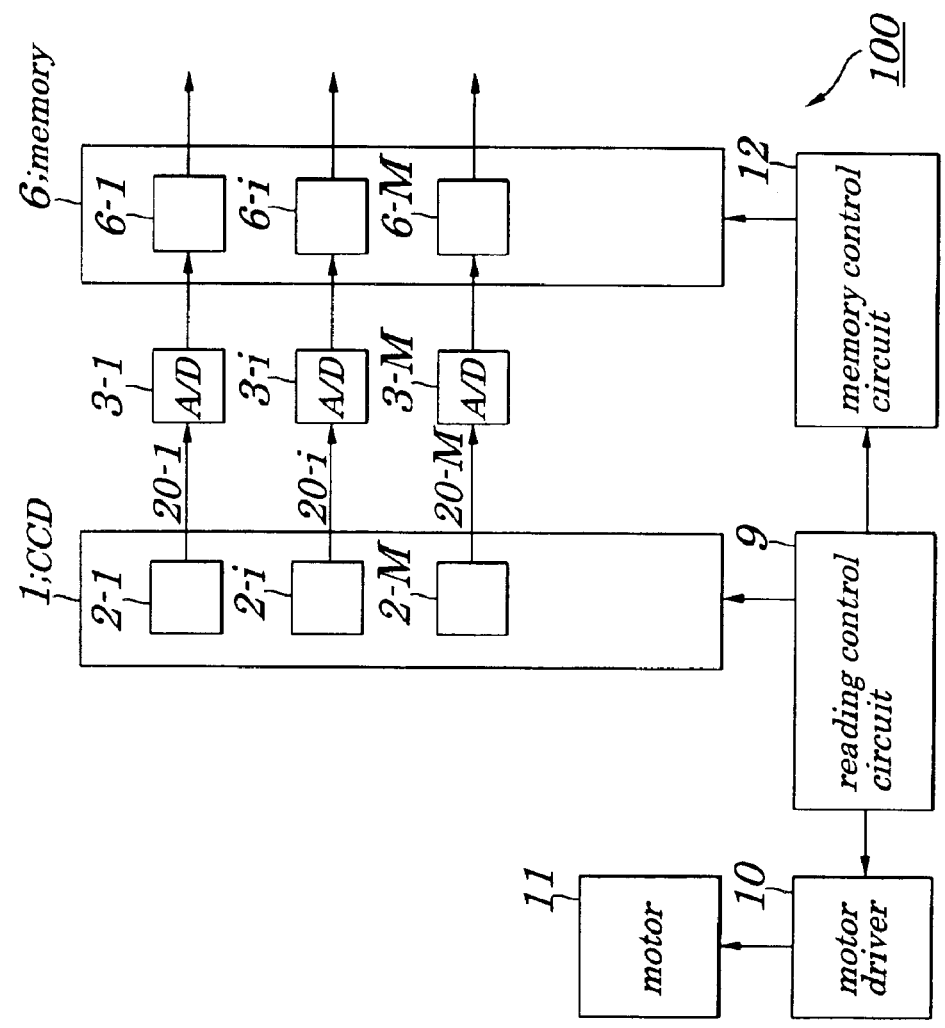
FIG. 1 is a schematic block diagram showing electrical configurations of an image reading apparatus according to a first embodiment of the present invention.
Figure 2:
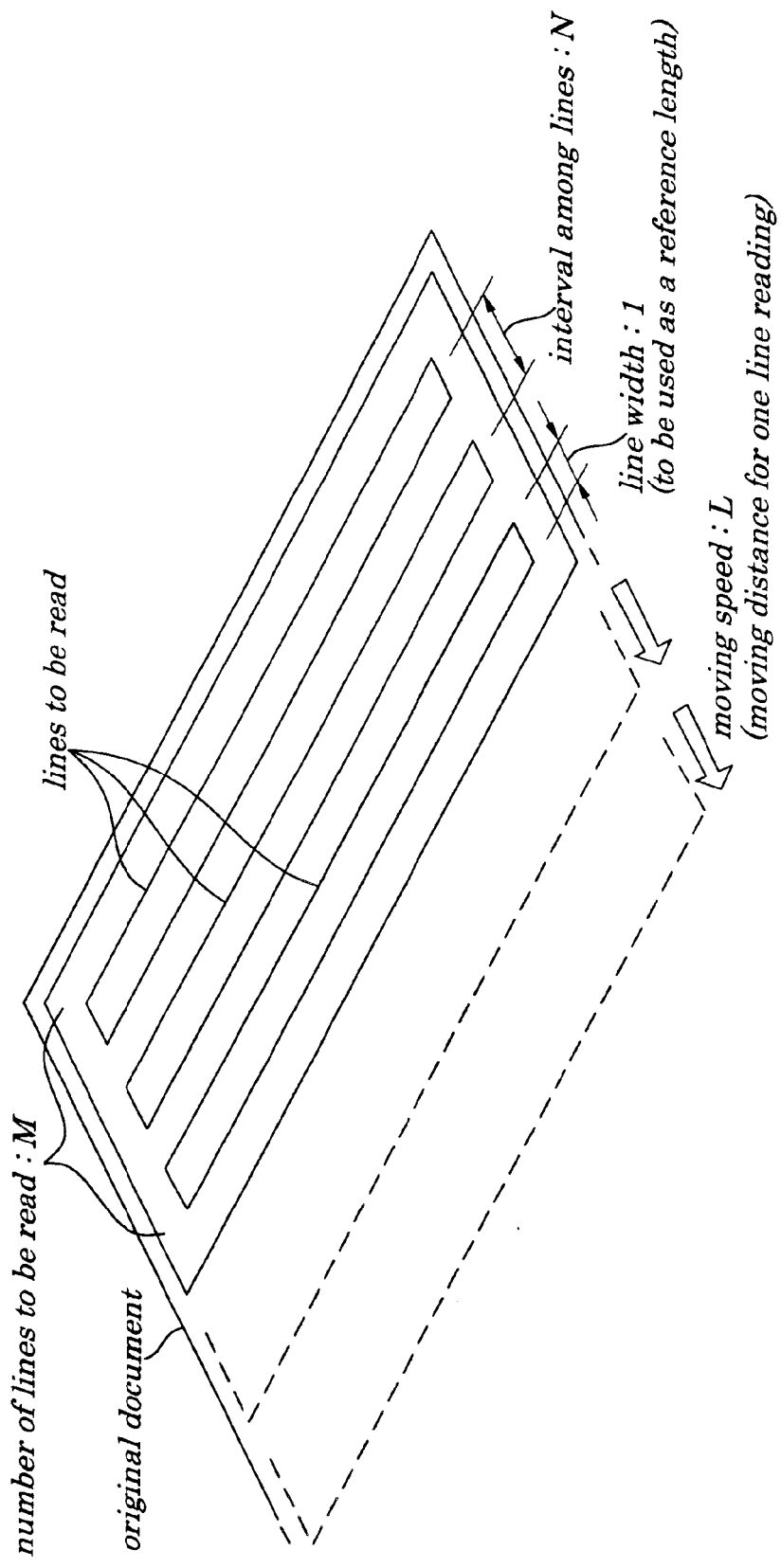
FIG. 2 is a perspective view of geometric placement of lines to be read by the image reading apparatus and their dimensions according to the first embodiment of the present invention.
Figure 3:
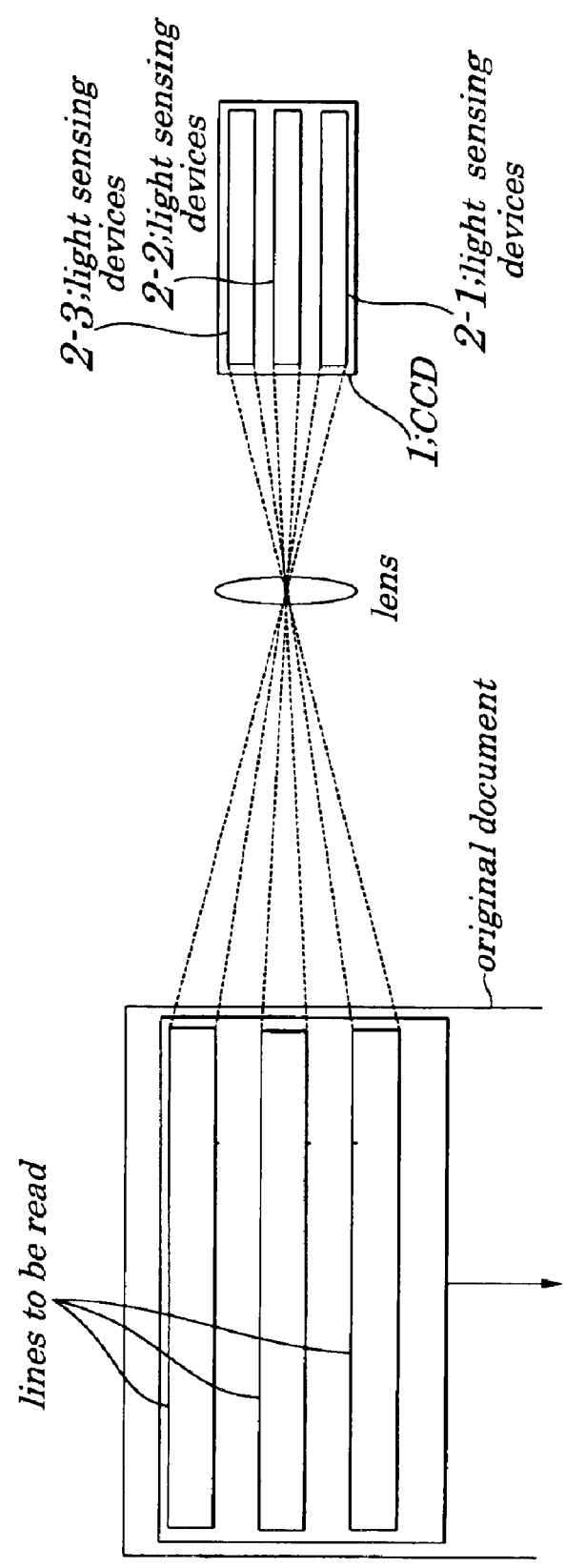
FIG. 3 is a diagram showing line-like strings of light sensing devices making up a CCD according to the first embodiment of the present invention.
Figure 4:
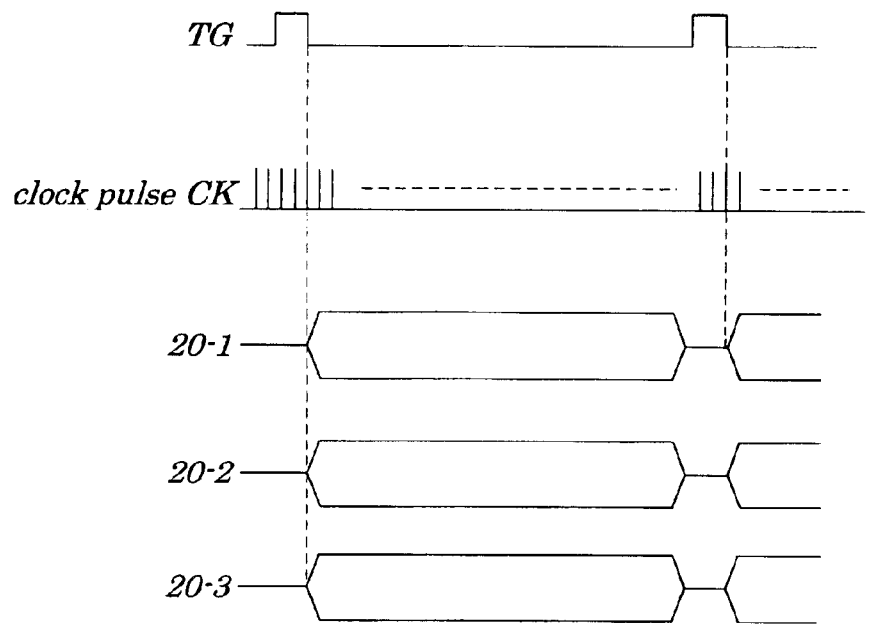
FIG. 4 is a timing chart explaining timing of reading an original document by the image reading apparatus according to the first embodiment of the present invention.
Figure 5:
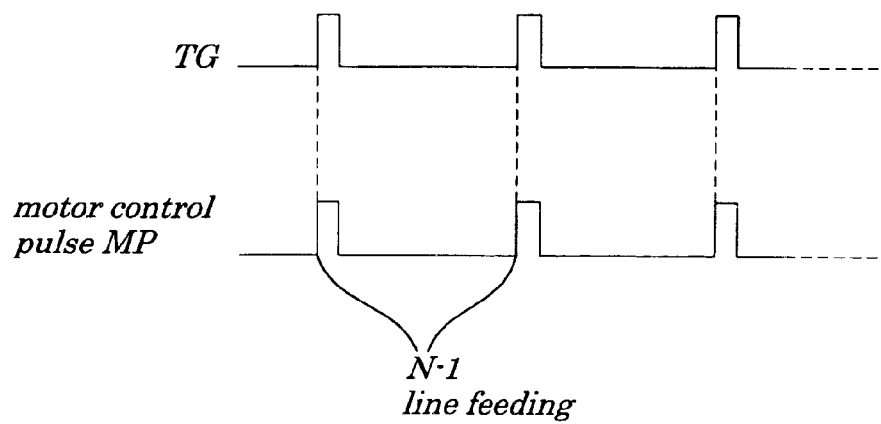
FIG. 5 is a timing chart explaining timing of feeding the original document in the image reading apparatus according to the first embodiment of the present invention.
Figure 6:
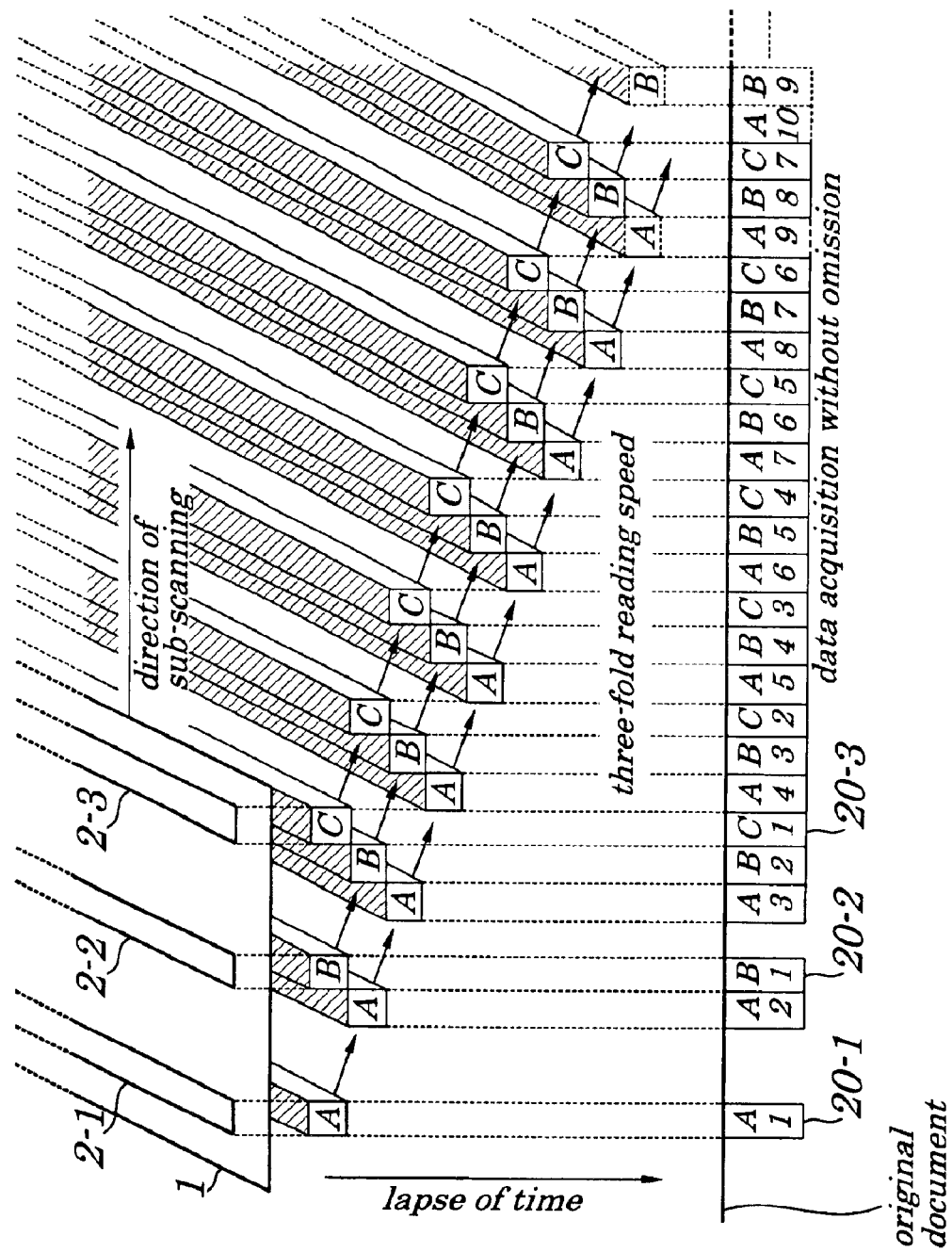
FIG. 6 is a diagram explaining operations of exact reading the original document in the image reading apparatus according to the first embodiment of the present invention.

FIG. 1 is a schematic block diagram showing electrical configurations of an image reading apparatus 100 according to a first embodiment of the present invention. FIG. 2 is a perspective view of geometric placement of lines to be read ("line to be read" hereinafter being referred to as a "reading line") by the image reading apparatus 100 and their dimensions according to the first embodiment. FIG. 3 is a diagram showing line-like strings 2-1, 2-2, and 2-3 of light sensing devices making up a CCD 1 according to the first embodiment. FIG. 4 is a timing chart explaining timing of reading an original document by the image reading apparatus 100 according to the first embodiment. FIG. 5 is a timing chart explaining timing of feeding the original document in the image reading apparatus 100 according to the first embodiment. FIG. 6 is a diagram explaining operations of exact reading the original document in the image reading apparatus 100 according to the first embodiment. FIG. 7 is a table showing combinations of the number of line-like strings of light sensing devices and intervals among line-like strings of light sensing that can be used in the image reading apparatus 100 according to the first embodiment.

The image reading apparatus 100 of the first embodiment is so configured as to achieve an economical and efficient operations by simultaneously reading a plurality of reading lines using a plurality of strings of line-like light sensing devices while the original document is being moved at a specified speed in a sub-scanning direction, which chiefly includes the CCD 1 having M pieces of line-like strings 2-$i$ ("$i$" is any one of 1, 2, . . . M) of light sensing devices, analog/digital converting circuits (hereafter being referred to as A/D converting circuits) 3-$i$ each being connected to each of the M pieces of line-like strings of light sensing devices, memory regions 6-$i$ each being connected to each of the A/D converting circuits, a reading control circuit 9, a motor driver 10, a motor 11 and a memory control circuit 12.

Each of the line-like strings of light sensing devices making up the CCD 1, in response to a clock pulse and a trigger signal fed from the reading control circuit 9, is adapted to output an image signal 20-$i$ obtained by reading each of corresponding reading lines (see FIG. 4). A clock pulse CK (FIG. 4) is a clock produced every time an image data is stored in a pixel by reading data along the line in a main-scanning direction which is therefore called a "pixel clock" for an image signal. The trigger signal TG (FIG. 4) is a timing signal used to control reading and storing operations by the CCD 1, which is produced every time the CCD 1 has completed the reading.

Each of the line-like strings 2-$i$ of light sensing devices is placed so as to be spaced by N pieces of the reading lines (N being not less than 2). This means that an interval among line-like strings 2-$i$ of light sensing devices is represented by N pieces of the reading lines. These strings 2-$i$ of light sensing devices are disposed so as to be in parallel to each other. Moreover, each of lines to be read by each of the line-like strings of light sensing devices is spaced by (N−1) pieces of the reading lines, that is, the (N−1) pieces of lines are the number of lines of the original document to be moved every time the lines are read by the line-like strings of light sensing devices. In this embodiment, the number M of pieces of the line-like strings of light sensing devices making up the CCD 1, the interval N among the line-like strings of light sensing devices and a moving speed L for reading one line of the original document (that is, a distance to be moved per one reading unit time) are set in a manner so as to satisfy the following three equations: $M \geq 2$, $N \geq M+1$, and $L=N-1$. These three equations are hereinafter referred collectively to as an "expression (1)". The most favorable relation is the case expressed by $N=M+1$.

The reason why the above condition "$N \geq M+1$", one of the conditions provided in the above expression (1), has to be met will be explained below. If a value of N being the interval among the line-like strings 2-$i$ of light sensing devices making up the CCD 1 represented by the number of reading lines, is smaller than the "M+1", for example, if N=M, there are two or more lines that are read in a duplicated manner by each of the line-like strings of the light sensing devices. A condition to avoid such the duplicated reading is "$N \geq M+1$" which is also another condition provided in the expression (1). Moreover, though the most favorable case is N=M+1, the case N>M+1 is also favorable. However, when N>M+1, the number of lines a first part of and a last part of which cannot be read increase, that is, the number of lines whose reading is skipped increase. Furthermore, if the number of the line-like strings of light sensing devices making up the CCD 1 is three, a conventional color image reading CCD from which a color filter for R, G, and B (Red, Green, and Blue) color signals is removed can be used. That is, the conventional color image reading CCD is made up of three line-like strings of light sensing devices each being used for each of the RGB color signal and of three pieces of color filters for the RGB color signal each being also constructed of a line-like string of light sensing devices. To manufacture the CCD 1 by using a manufacturing process of the conventional color image reading CCD, a process of coating for the color filter included in its manufacturing processes is omitted and the three line-like strings of light sensing devices making up the CCD 1 are mounted so that each of the three line-like strings of light sensing devices is placed apart, for example, by four pieces of the reading lines.

Each of the A/D converting circuits 3-$i$ performs A/D conversion of each of the read image signal 20-$i$ to be output from each of the line-like strings 2-$i$ of light sensing devices. The memory 6 has memory regions 6-$i$ ("$i$" is any one of 1 to M). Each of the memory regions 6-$i$ sequentially stores, under control of the memory control circuit 12, pixel data obtained from one reading line which has been A/D converted by the A/D converting circuit 3-$i$ and outputs the stored pixel data in order of lines to be read in a sub-scanning direction. Each of the memory regions 6-$i$ has a memory capacity to store one M-th pixel data contained in one piece of the original document and therefore the entire memory region 6-$i$ has the capacity to store pixel data of a maximum one page.

The reading control circuit 9, in response to the trigger signal TG, feeds a motor control pulse MP (FIG. 5) to the motor 11, every time the CCD 1 completes one reading of the line on the original document. The motor control pulse MP includes three kinds of pulses, one being fed to the motor 11 every time the line-reading which starts from a line existing backward by specified numbers of reading lines determined based on above values M, N, and L, in a sub-scanning direction, from a first line out of lines to be normally read ("line to be normally read" being hereinafter referred to as a "normal reading lines" which means that the lines are those to be sequentially read by the line-like strings of light sensing devices at a pre-set speed and not those used to express the interval among the line-like strings of light sensing devices or the reading speed), from the original document, is completed, another motor pulse MP being fed to the motor 11 every time the line-reading which starts from the normal reading line and ends at a last normal reading line is completed, and further another motor pulse MP being fed to the motor 11 every time the line-reading which starts from the last normal reading line and ends at a line existing forward by specified numbers of reading lines determined based on values M, N, and L in a sub-scanning direction, is completed. Any one of the motor control pulses MP is a control pulse used to cause the original document to travel by (N−1) pieces of lines to be read.

The motor driver 10 feeds a drive signal, in response to the motor control pulse MP, to the motor 11. The motor 11 operates so that the original document is traveled along reading surfaces of the CCD 1, that is, the motor 11, in response to the drive signal fed from the motor driver 10, drives a document carrying device (not shown) so as to cause the original document to travel from a position of a line that has been already read, by (N−1) pieces of reading lines.

The memory control circuit 12, to store and read pixel data to and from the memory regions 6-$i$, sequentially feeds each of signals described below to the memory regions 6-$i$. That is, if there are some lines which are read before the first normal reading line of the original document is read, the memory control circuit 12, sequentially feeds a writing stop signal used to stop writing of the image data of the reading line to be read before the first normal reading line is read, to the memory regions 6-$i$. If the reading of the first normally line to the last normally line is performed, the memory control circuit 12 sequentially feeds a memory selecting signal and an address signal used to store pixel data obtained by reading the normal reading lines, to the memory regions 6-$i$. If there are some lines that are read after the last normal reading lines of the original document is read, the memory control circuit 12, sequentially feeds a writing stop signal used to stop writing of the image data of the line, to the memory regions 6-$i$. After the reading of the normal reading lines is completed, that is, after storing of pixel data in the memory regions 6-$i$ is completed, a memory selecting signal and an address signal used to read pixel data of the normally lines for which the first reading has been started are sequentially fed to the memory region 6-$i$.

Next, operations of the image reading apparatus 100 of the embodiment are described by referring to FIG. 1 to FIG. 7. For convenience of simplified description of the operations, let it be assumed that the number M of the line-like strings of light sensing devices is three, the interval N among the line-like strings of light sensing devices is four and the moving speed L for reading one line of the original document is three. Here, each of the three line-like strings of light sensing devices is represented by 2-1, 2-2, and 2-3. Each of the image signals output from each of the line-like strings 2-1, 2-2, and 2-3 of light sensing devices is represented by 20-1, 20-2, and 20-3, respectively. Each of the three A/D converting circuits is represented by the reference numbers 3-1, 3-2, and 3-3. Each of the three memory regions is represented by the reference numbers 6-1, 6-2, and 6-3, respectively.

Each of the memory regions 6-1, 6-2, and 6-3 has a capacity of storing pixel data of the normal reading lines of one-third of one page of the original document. Therefore, the entire memory regions 6-1, 6-2, and 6-3 can store pixel data of all the normal reading lines existing within maximum one page.

Now, in the embodiment, let it be assumed that, in a state where the original document is correctly placed in the image reading apparatus 100, the line-like string 2-1 of light sensing devices is positioned on a reading line existing in a 6-th position backward in a sub-scanning line, from an normal reading lines on the original document (that is, on the line from which the reading starts; see A1 in FIG. 6, however, the A1 is a image signal read by the line-like string 2-1 of light sensing devices from the corresponding line from which the reading by the line-like string 2-1 of light sensing devices starts) and the line-like string 2-2 of light sensing devices is positioned on a line existing apart by four reading lines from a line for which the reading starts (see B1 in FIG. 6; however, the B1 is a image signal read by the line-like string 2-2 of light sensing devices from the line existing forward by four reading lines in the sub-scanning direction from the corresponding line from which the reading starts, as described later) and the line-like string 2-3 of light sensing devices is positioned on a line existing apart by four reading lines from the line where the line-like string 2-2 of light sensing devices is positioned on a line existing apart by four reading lines from the line for which the reading is to be done by the line-like string 2-3 of light sensing devices (see C1 in FIG. 6; however, the C1 is a read image signal read by the line-like string 2-3 of light sensing devices from the line existing forward by four reading lines in the sub-scanning direction from the corresponding line from which the reading starts, as described later). In this state, each of reading lines is read simultaneously by each of the line-like strings 2-1, 2-2, and 2-3 of light sensing devices receiving reflected light, produced by irradiated light from a light source (not shown) from each of the lines on the original document (see FIG. 2 and FIG. 3).

That is, each of the line-like strings 2-1, 2-2, and 2-3 of light sensing devices, in response to the clock pulse CK sequentially fed from the reading control circuit 9, simultaneously produces each of read signals 20-1, 20-2, and 20-3 each obtained by reading one line. The read image signals 20-1, 20-2, and 20-3 (FIG. 4) each being obtained by reading one line are hereinafter referred simply to as the "image signals 20-1, 20-2, and 20-3". Moreover, in FIG. 6, each of the lines of the original document to be read by each of the line-like strings of light sensing devices making up the CCD 1 is shown as "A", "B", or "C". Furthermore, in FIG. 6, each of the "A1", "B1", and "C1" shows each of the read image signals 20-1, 20-2, and 20-3 obtained in the first reading operation by each of the line-like strings 2-1, 2-2, and 2-3 of light sensing devices making up the CCD 1, respectively.

The reason why the first reading operation is performed beginning with a line existing backward by six reading lines from the first normal reading lines is to avoid omission of reading of the normal reading lines on the original document. The reason will be described below in detail.

That is, as shown in FIG. 6, if the first normal reading lines on the original document (the reading line corresponding to "A1" shown in FIG. 6) is attempted to be read by the CCD 1, there are lines that cannot be read in lines existing between the normal reading lines A that is read in the first reading operation by the line-like string 2-1 of light sensing devices and the normal reading lines A that is read in the third reading operation by the line-like string 2-1 of light sensing devices. That is, the second, third, and sixth normal reading lines from the line A to be read in the first reading operation by the line-like string 2-1 of light sensing devices (two lines to be read existing between A1 and A2 in FIG. 6 and one reading line existing between B1 and A3 in FIG. 6) cannot be read. This means that necessary reading image signals that have to be obtained from these three normal reading lines are omitted.

In order to avoid such the omission of reading the normal reading lines and to successfully read all of them in all original documents, in the case of M=3, N=4, and L=3, for example, the image reading apparatus 100 of the embodiment is configured so that the CCD 1 starts the reading from the line existing by six pieces of reading lines backward in a sub-scanning direction from the first line of the original document 200.

Since each of the line-like strings 2-1, 2-2, and 2-3 of light sensing devices of the CCD 1 is mounted so as to be spaced by four (=N) reading lines, image signals 20-1, 20-2, and 20-3 are signals obtained by reading lines each being spaced by four reading lines of the original document.

While the original document is moving so that another three lines are read by the line-like strings 2-1, 2-2, and 2-3 of light sensing devices of the CCD 1, each of the output image signals 20-1, 20-2, and 20-3 is A/D converted by each of the A/D converters 3-1, 3-2, and 3-3 and A/D converted pixel data is supplied to each of the memory regions 6-1, 6-2, and 6-3. However, the pixel data obtained through the reading of the lines to be fed to the memory regions 6-1 and 6-2 are not data obtained from normal reading lines, but data obtained from "non-normally" reading lines. That is, there are two kinds of reading lines, one being the normal reading lines and the other being the non-normal reading lines Therefore, in order to prevent the image data obtained from the two non-normal reading lines output from the A/D converting circuits 3-1 and 3-2 from being stored in the memory regions 6-1 and 6-2, the memory control circuit 12 feeds writing stop signals to the memory regions 6-1 and 6-2. This prevents the image data obtained from the non-normal reading lines being stored in the memory regions 6-1 and 6-2.

On the other hand, since the image data obtained by reading one reading line to be fed to the memory region 6-3 is the image data obtained from the normal reading lines, the memory control circuit 12 feeds a writing signal to the memory region 6-3 to store the image data obtained from reading the normal reading lines.

After the reading of lines by the line-like strings 2-1, 2-2, and 2-3 of light sensing devices has been completed, the original document 200 moves from the lines that have been already read to lines existing by another three lines forward. After the completion of the line reading operation by the line-like strings 2-1, 2-2, and 2-3 of light sensing devices (after the completion of the first line reading operation by the CCD 1) that is, after the completion of the reading of pixels by the light sensing devices to which the last clock pulse is fed (after the completion of scanning), as shown in FIG. 4, a next trigger signal TG is generated. The reading control circuit 9, in response to the next trigger signal TG, produces the motor control pulse MP.

The motor driver 10 produces a drive signal used to drive the motor 11 in accordance with the motor control pulse MP to be fed from the reading control circuit 9. The motor 11 having received the drive signal moves, in the sub-scanning direction, the original document 200 by 3 (N−1) pieces of the reading lines from the line that has been already read. Thus, the original document 200 is moved by three lines forward in a sub-scanning direction, in response to the motor control pulse MP. The image data is not stored in the memory regions 6-1 and 6-2, but is stored in the memory region 6-3 and, when the storing in the memory region 6-3 is completed, the original document 200 has been moved by three lines forward from the line that has been already read in the first reading operation (see FIG. 6). After the original document 200 has been moved by three lines forward in the sub-scanning direction, each of the line-like strings 2-2 and 2-3 of light sensing devices is placed on each of new normal reading lines on the original document 200, but the line-like string 2-1 of light sensing devices is placed on a new non-normal reading lines. At this new reading position, each of the line-like strings 2-1, 2-2, and 2-3 of light sensing devices reads one line of the three reading lines and the image signals 20-1, 20-2, and 20-3 obtained in the second reading operation are A/D converted by the A/D converting circuit. In FIG. 6, the image signals obtained in the second reading operation are shown as "A2, B2, and C2". Since the A/D converted image data obtained by reading new one line and output from the A/D converting circuit 3, out of the A/D converted image data obtained in the second reading operations, is the data obtained by reading the non-normal reading lines, as described above, the writing stop signal is fed from the memory control circuit 12 to the memory region 6-1, causing no storing operations. However, since the image data, each being obtained by reading new one line, output from the A/D converting circuits 3-2 and 3-3 are the data obtained by reading the normal reading lines, as described above, the writing signal is fed from the memory control circuit 12 to the memory regions 6-2 and 6-3 and storing operation to the memory regions 6-2 and 6-3 are performed.

After the original document has been moved to undergo the second reading operation and then the reading has been completed and, when the original document is further moved by three reading lines forward for third reading operations, it is needless to say that both the line-like strings 2-2 and 2-3 of light sensing devices are placed on the normal reading lines and the line-like string 2-1 of light sensing devices is also placed on the normal reading lines. In this position, in the same manner as described above, the third reading operation is performed. The image signals obtained in the third reading operation are shown as "A3, B3, and C3" in FIG. 6.

All of the image signals obtained in the third reading operation are image signals obtained by reading the normal reading lines. Therefore, when each of the A/D converted image data is fed to one of corresponding memory regions 6-1, 6-2, and 6-3, since writing signals are fed from the memory control circuit 12 to the memory regions 6-1, 6-2, and 6-3, the image data, each being obtained by reading new one line, can be stored in the memory regions 6-1, 6-2, and 6-3. From the fourth reading and storing operations to the last reading and storing operations in which the line-like string 2-3 of light sensing devices reaches a last normal reading lines and reads the last normal reading lines, same reading and storing operations as performed in the third reading and storing operations are repeated continuously.

As described above, when the line-like string 2-3 of light sensing devices has reached the last normal reading lines, that is, to a position of data C7 in FIG. 6, and has completed the reading of the last normal reading lines and has completed the storing of the data C7 obtained by the reading operation of the last normal reading lines, the reading control circuit 9 outputs the motor control pulse MP to drive the motor 11 and to move the original document to a line existing further by three reading lines forward. This is because, if the line-like string 2-3 of light sensing devices stops reading of the original document at a position in which it has read the last normal reading lines, as in the case where the reading of the original document has been initially started, the omission of reading the normal reading lines occurs. At this point, all of the line-like strings 2-1, 2-2, and 2-3 of light sensing devices are moved from the position where they have already completed the reading and storing of the normal reading lines to a line existing by three reading lines forward. This means that there are still three normal reading lines that have not been read. At this point, the line-like strings 2-1 and 2-2 of light sensing devices are placed on the normal reading lines, however, the line-like string 2-3 of light sensing devices is still placed on the non-normal reading lines. Since the data obtained by the line-like strings 2-1 and 2-2 of light sensing devices and output from the A/D converting circuit 3-1 and 3-2 are data of the normal reading lines, the memory control circuit feeds the writing signal to the memory regions 6-1 and 6-2 and pixel data output from the A/D converting circuit 3-1 and 3-2 is stored in the memory regions 6-1 and 6-2. However, since the image data obtained through the reading by the line-like string 2-3 of light sensing devices and output from the A/D converting circuit 3-3, is the data obtained by reading the non-normally line, the writing stop signal is fed from the memory control circuit 12 to the memory region 6-3, and the image data of the one line to be output from the A/D converting circuit 3-3 is not stored in the memory region 6-3 accordingly. In order to read three normally lines that have not yet been read, further two times of reading operations are required. The line on which the line-like string 2-1 of light sensing devices is placed after the movement of the original document by three lines forward is the last normal reading lines, but the lines on which the line-like strings 2-2 and 2-3 of light sensing devices are placed are non-normal reading lines. The same reading operations are continued here. Since pixel data obtained by reading of the line-like string 2-1 of light sensing devices and output from the A/D converting circuit 3-1 are the data from the normal reading lines, the memory control circuit 12 outputs the writing signal and feeds it to the memory region 6-1 and the pixel data for the one line is stored in the memory region 6-1.

The reason why the line-like string 2-3 of light sensing devices is moved twice by three pieces of lines in the sub-scanning direction after it has been placed on the last normal reading lines on the original document is described below. That is, as in the case where the omission of reading lines occurs at the first stage of starting the reading of the original document, when the lines are read by the three pieces of the line-like strings 2-1, 2—2, and 2-3 of light sensing devices, the second, third, and sixth lines from the last reading lines in one page cannot be read. In order to prevent the omission of reading lines and to be able to read all normal reading lines, further six consecutive pieces of lines in a sub-scanning direction are read which exist next to the normal reading lines on the original document read by the line-like string 2-3 of light sensing devices.

As described above, after the reading operation has been performed up to the last normal reading lines, the pixel data for one third of a page of the original document has been stored in the memory regions 6-1, 6-2, and 6-3. Therefore, the entire memory regions 6-1, 6-2, and 6-3 have stored pixel data of all the normal reading lines existing within maximum one page.

After the above storing operation in the memory regions 6-1, 6-2, and 6-3 has been completed, the memory control circuit 12 instructs the memory regions 6-1, 6-2, and 6-3 to read each of data of the lines shown in FIG. 6 from the left in order. That is, the memory control circuit 12 produces a memory selecting signal and an address signal to be fed to each of the memory regions 6-1, 6-2, and 6-3, which are used to sequentially read each of the pixel data of the normal reading lines shown in FIG. 6 in the form of signals obtained by scanning each of the lines from the left in order.

FIG. 7 is a table showing combinations of the number of strings of line-like light sensing devices and values of intervals among line-like strings of light sensing devices of the first embodiment. These are combinations of values M and N contained in the above expression (1). In the table in FIG. 7, the combination shown by a mark of "○" indicates a case where each of the values M and N can meet the condition required in the expression (1). The combination shown by a mark of "x" indicates a case where each of the values M and N cannot meet the condition required in the expression (1).

Thus, according to configurations of the image reading device of the first embodiment, by using the CCD that can simultaneously read M pieces of reading lines each having an interval represented by the number of reading lines N not being read are simultaneously read in the sub-scanning direction and, at a time when the M pieces of reading lines have been read, the original document is moved by (N−1) pieces of reading lines forward and when the CCD moves to stay on the reading line which had been moved by the (N−1) pieces of reading lines forward, the subsequent line reading operation is performed repeatedly, thus enabling the line reading operation to be made faster by M times or by times being smaller than M which is determined based on the relation among the values M, N, and L, compared with the conventional reading, and thus achieving high-speed reading.

Moreover, since such the high-speed reading is implemented by the configuration and acquisition of sufficient reading output is enabled, it is not necessary to shorten time for which electric charges are accumulated by the line-like string of light sensing devices. Owing to this, it is not necessary to make slow the scanning time of the CCD for exact reading and it is possible to achieve a high S/N (signal-to-noise) ratio without increasing an amount of light shone from the light source on the original document. Since it is not necessary to increase the amount of light to be shone to the original document, increases in temperature within the document reading device can be inhibited and the document reading device can be made compact. Also, it is possible to use a light source having even a low luminance. Moreover, since high speed scanning using low amounts of light is made possible, power consumption can be greatly reduced. Furthermore, manufacturing equipment for the conventional CCD can be used by omitting coating processes for color filters in processes of the conventional color image CCD, that is, by setting the equipment so that three pieces of line-like strings of light sensing devices are assembled so as to be placed by four reading lines apart, which, as a result, serves to reduce manufacturing costs.

Second Embodiment

Figure 8:
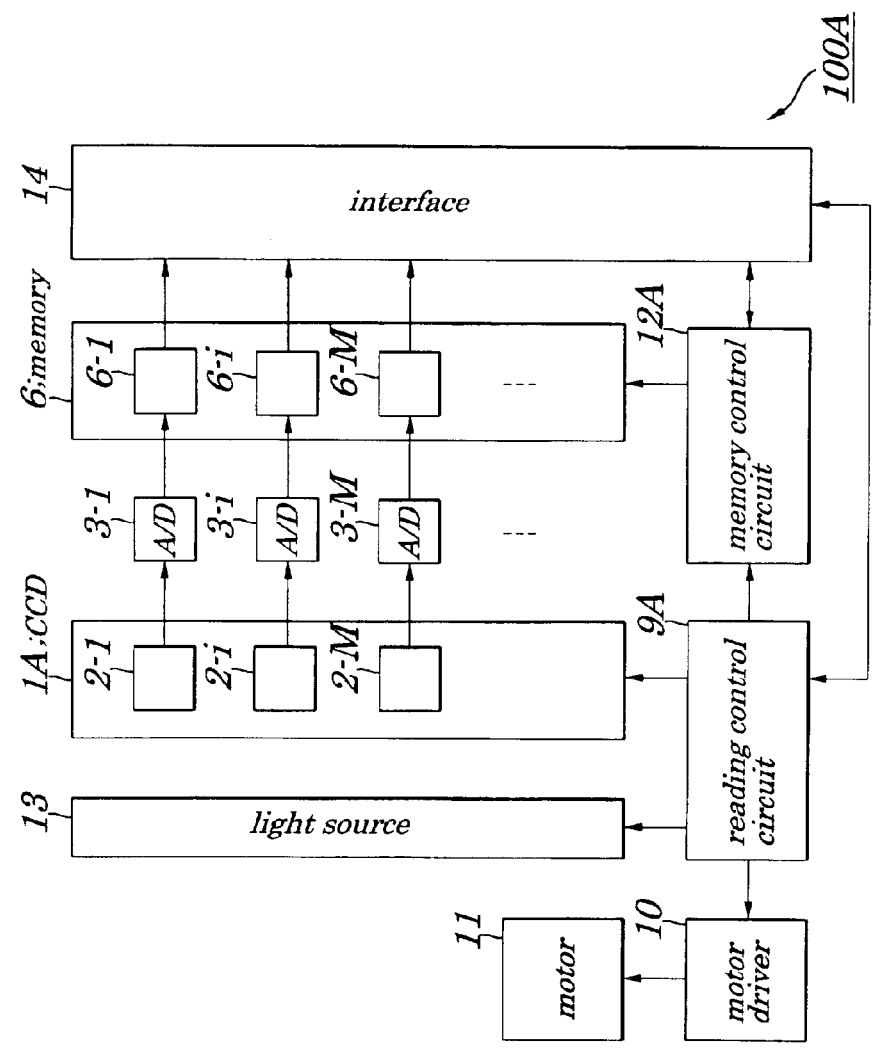
FIG. 8 is a schematic block diagram showing electrical configurations of an image reading apparatus according to a second embodiment of the present invention.
Figure 9:
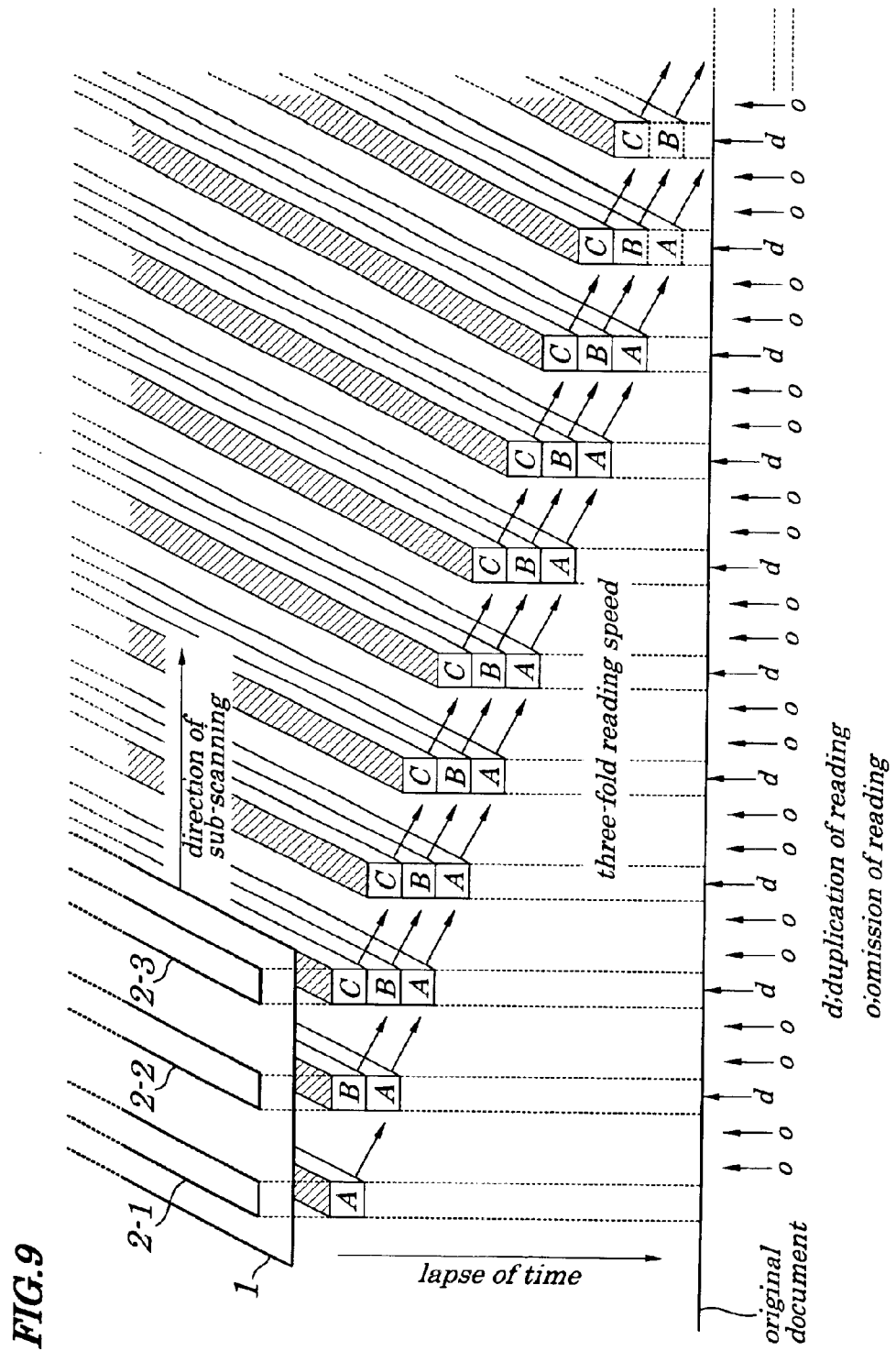
FIG. 9 is a diagram showing an example of a case where the image reading apparatus cannot be used according to a second embodiment of the present invention.
Figure 10:
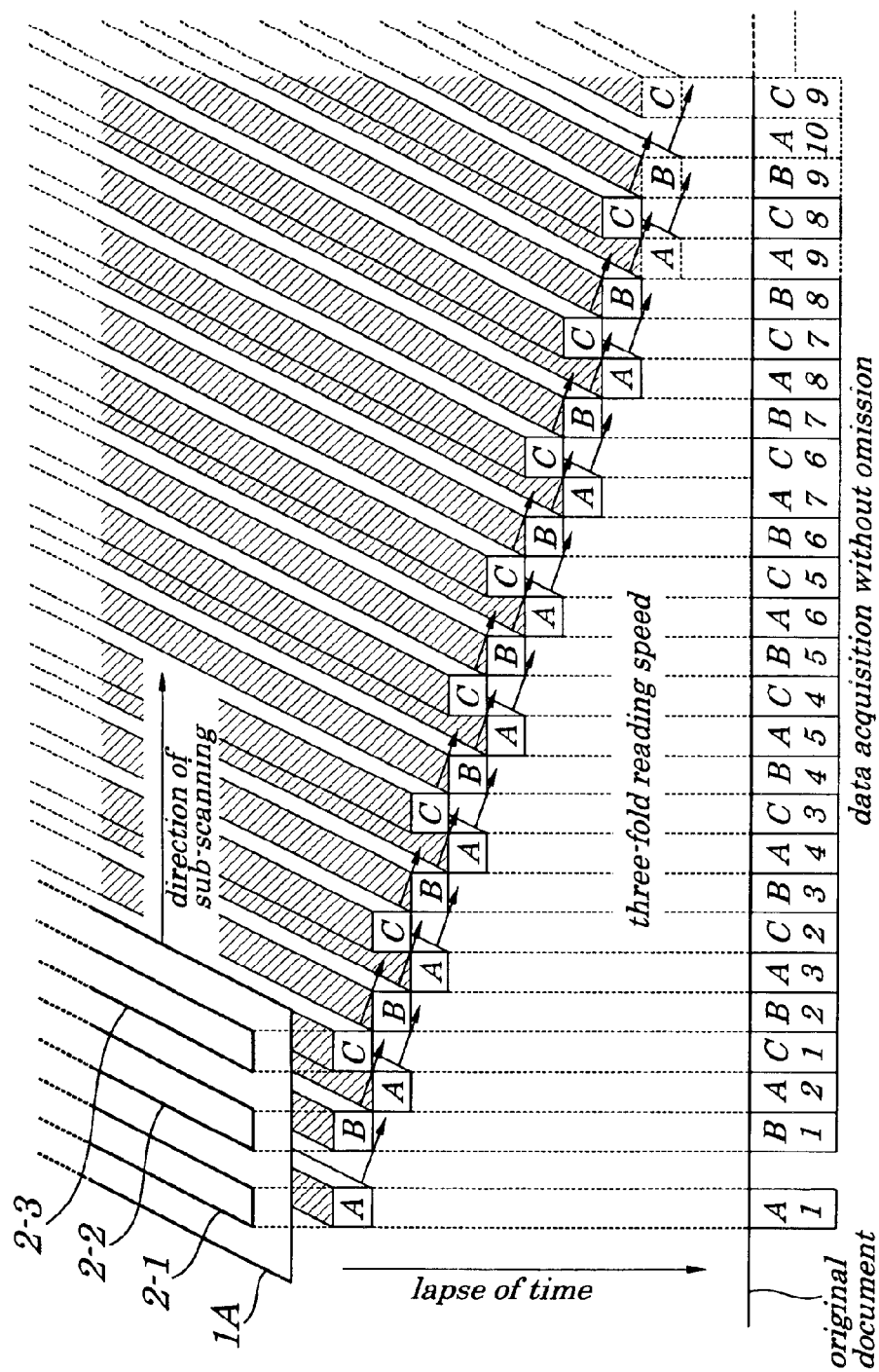
FIG. 10 is a diagram showing an example of a case where an original document can be read exactly by the image reading apparatus according to the second embodiment of the present invention.
Figure 12:
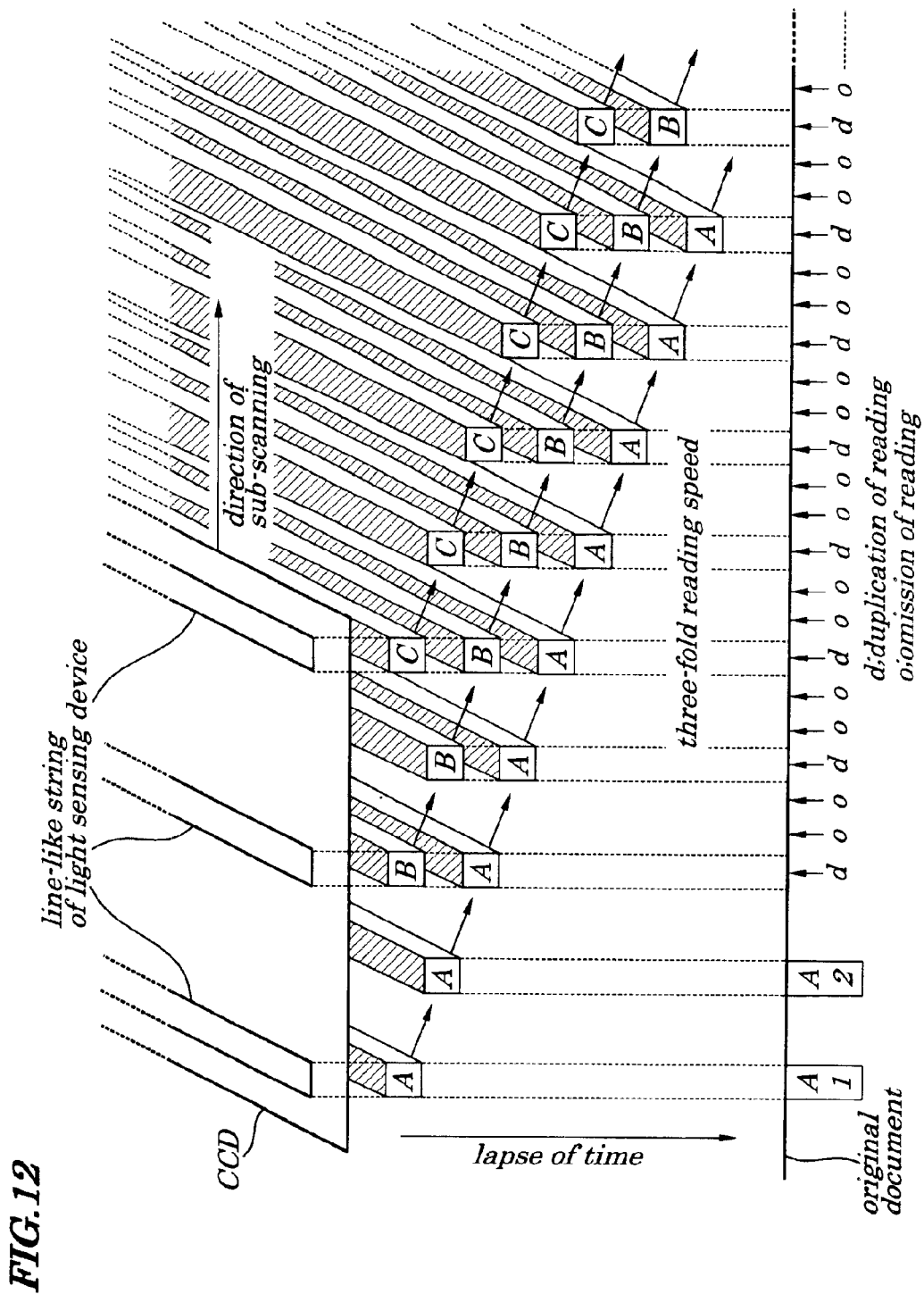
FIG. 12 is a diagram showing an example of a case where the image reading apparatus cannot be used, according to a second embodiment of the present invention.

FIG. 8 is a schematic block diagram showing electrical configurations of an image reading apparatus according to a second embodiment of the present invention. FIG. 9 is a diagram showing an example of a case where the image reading apparatus 100 of a first embodiment cannot be used. FIG. 10 is a diagram showing an example of a case where an original document 200 can be read exactly by the image reading apparatus 100A according to the second embodiment. FIG. 11 a table showing combinations of the number of strings of line-like light sensing devices and intervals among line-like strings of light sensing devices. FIG. 12 is a diagram showing an example of a case where the image reading apparatus cannot be used.

Configurations of the second embodiment differ from those of the first embodiment in that normal reading lines can be read without an occurrence of duplication and omission of reading lines to be read, even if conditions of N≧M+1 and L=N−1 are removed in sequential reading operations in which M pieces of reading lines each having an interval N represented by the number of reading lines being not read, are simultaneously read.

Again, let it be assumed that the number of line-like strings of light sensing devices making up a CCD 1A is M, the interval among the line-like strings of light sensing devices (represented by the number of reading lines) is N, and moving speed for reading one line of the original document 200 is L. In the second embodiment, a setting is made so that M≧2, L=M and a greatest common measure of L and N is 1. This relation is referred to as an expression (2). That is, in this embodiment, the CCD 1A is so configured that the M and N satisfy the expression (2) and the moving speed of reading lines to be read by the CCD 1A is set to L and a reading control circuit 9A and a memory control circuit 12A are so controlled that the normal reading lines on the original document can be read without omission of reading.

Configurations of this embodiment are based on the following understandings. That is, there is a case where the original document cannot be exactly read even if conditions provided in the above expression (1) can be met. For example, in the expression (1), if N>M+1, L>M. If L>M, there is a case where omission and/or duplication of the reading occur. Moreover, if the conditions of the above expression (1) are not satisfied, for example, if L<M, the duplication occurs inevitably and omission of the reading occurs in some cases.

Moreover, examples that can satisfy the expression (1) are shown in FIG. 7 and, in FIG. 7, even if the values M and N can meet the conditions expressed by a mark "○", there is a case where omission of the reading occurs and, inversely, even if the values M and N can meet the condition expressed by a mark "x", there is a case where lines can be read without such the omission of reading.

To avoid this inconvenience, the image reading apparatus 100A of the embodiment is so configured that the condition L=M provided in the expression (2) is incorporated. However, even when the above condition L=M is incorporated, there is still a relation among the values M, N, and L in which, since a line existing at a position being moved by L has been read and the line that has been already read is again read by other line-like string of light sensing devices, not only the duplication of the reading but also the omission of the reading occur and therefore the image reading apparatus 100A of the embodiment is so configured that the condition that the greatest common measure of L and N is 1, that is, L and N has no common divisor other than 1 is incorporated.

Therefore, a difference in configurations between the image reading apparatus 100A of this second embodiment and of the first embodiment is as follows: That is, the CCD 1A of this embodiment has the M pieces of the line like strings of light sensing devices each having the interval represented by the number of reading lines being not read "N" as in the case of the first embodiment, however, the moving speed for reading one line of the original document 200 satisfies the above expression (2) in the relations of M and N.

Configurations of the reading control circuit 9A of this embodiment are the same as those of the first embodiment except for following points. A motor control pulse MP produced based on an instruction signal (TG in FIGS. 4 and 5) fed from an image processing system (not shown) to which the image reading apparatus 100A is connected through an interface 14, every time one line reading operation is completed by the CCD 1A, is adapted to move the original document 200 at the moving speed that has been pre-set so as to satisfy the above expression (2).

Moreover, the original document 200 is initially placed in a manner that the reading operation starts from a line existing backward by specified numbers of reading lines determined based on values M, N, and L that can satisfy the expression (2) in a sub-scanning direction. Moving control by the reading control circuit 9A is started from the reading line positioned as above.

The reading control circuit 9A produces the motor control pulses MP (shown in FIG. 5) every time the sequential one line reading operation is completed which reads from a last normal reading lines to a line existing immediately before a line positioned by specified numbers of reading lines determined based on the values M, N, and L that can satisfy the expression (2) forward in the sub-scanning line.

Configurations of the memory control circuit 12A of the second embodiment are the same as those of the first embodiment except that there are not stored in a memory region 6-i pixel data of lines read before the normal reading lines is read, in accordance with the moving control by the reading control circuit 9A, by the line-like string of light sensing devices, out of the M pieces of line-like strings of light sensing devices making up the CCD 1A, existing in the foremost position in the sub-scanning direction and pixel data of lines read after the reading of the last normal reading lines has been completed.

A light source 13 is used to shine light on reading lines of the original document 200 for reading operations.

The interface 14 is used to establish connections among the image processing system, reading control circuit 9A and memory control circuit 12A. The interface 14, every time one line reading operation by the CCD 1A is completed, receives an instruction signal to feed the motor control pulse MP for controlling the movement of the original document at the moving speed described above to a motor driver 10 and feeds it to the reading control circuit 9A and receives an acknowledgement signal for the instruction signal from the reading control circuit 9A and feeds it to the image processing system. Moreover, the interface 14 receives an instruction signal to instruct the memory control circuit 12A to read each of pixel data of one page obtained by reading normal reading lines stored in the memory region 6-i and feeds it to the memory control circuit 12A and receives an acknowledgement signal to confirm contents of the instruction signal from the memory control circuit 12A and feeds it to the image processing system. Since other configurations of the image reading apparatus 100A of the second embodiment except for those described above are the same as those in the first embodiment, the same reference numbers in the second embodiment are assigned to parts having the same functions as for the first embodiment and their descriptions are omitted accordingly.

Next, operations of the image reading apparatus 100A of the second embodiment will be described below by referring to FIG. 8 to FIG. 12. Prior to descriptions of operations of this embodiment, a case where the condition that the greatest common measure of L (=M) and N provided in the expression (2) is 1 cannot be met. As the example where the condition that the greatest common measure of L being the moving speed (=M being the number of the line-like strings of light sensing devices) and N being the interval among the line-like strings of light sensing devices provided in the expression (2) is 1, is not met, let it be assumed that M is 3, N is 3, and L is 3. Here, each of the three line-like strings of light sensing devices is represented by the reference numbers 2-1, 2-2, and 2-3. Each of the image signals output from each of the line-like strings 2-1, 2-2, and 2-3 of light sensing devices is represented by reference numbers 20-1, 20-2, and 20-3, respectively. Each of three A/D converting circuits 3-1, 3-2, and 3-3 is represented by reference numbers 3-1, 3-2, and 3-3. Each of three memory regions 6-1, 6-2, and 6-3 is represented by reference numbers 6-1, 6-2, and 6-3, respectively. Each of the line-like strings 2-1, 2-2, and 2-3 of light sensing devices is spaced by two pieces of reading lines, that is, the interval among the line-like strings 2-1, 2-2, and 2-3 of light sensing devices is represented by the two pieces of reading lines.

As in the case of the first embodiment, when an operation of reading a normal reading lines on the original document 200 is completed, the motor control pulse MP is output from the reading control circuit 9A. The motor control pulse MP is fed to the motor driver 10 and a drive signal is produced from the motor driver 10, which is fed to a motor 11. Therefore, the original document 200 is moved by two pieces of the normal reading lines forward in the sub-scanning direction. The three line-like strings 2-1, 2-2, and 2-3 of light sensing devices making up the CCD 1A move from the three normal reading lines that had been read before the original document 200 was moved to another three normal reading lines existing by two pieces of normal reading lines forward and reads these three normal reading lines they are placed newly. However, since N is set at 3 and L is set at 3, normal reading lines, to be read in order by each of the three line-like strings 2-1, 2-2, and 2-3 of light sensing devices making up the CCD 1A, as shown in FIG. 9, become the same normal reading lines that had been read in the previous reading operation and normal reading lines that have to be read this time cannot be read. This means that there occur the duplication of reading by the three line-like strings 2-1, 2-2, and 2-3 of light sensing devices and the omission of the reading (see FIG. 9. The reference numbers are the same as those in FIG. 6). That is, if the conditions that the greatest common measure of L (=M) and N is 1 and if N=3 and L=3 are met, there still occur normal reading lines that cannot be read, causing imperfect and unexpected reading of the original document 200.

In order to avoid such imperfect reading, if the values of M, N and L have to be selected that can satisfy the condition that the greatest common measure of L (=N) and N is 1, that is, if M=3, N=2, and L=3, since the values of M and N can satisfy the above expression (2), no duplication of reading normal reading lines occurs and exact reading of the normal reading lines by each of the three line-like strings is made possible. Therefore, an entire original document 200 can be read without omission of the reading.

FIG. 10 shows a case where values of M, N and L can satisfy the expression (2), where M=3, N=2, and L=3. In this case, the reading is three times faster when compared with the conventional case (reference numbers in FIG. 10 are the same as those in FIG. 6).

As described above, in order for the image reading apparatus 100A to exactly read the original document, the values of M, N and L are so set that they can meet the conditions provided in the expression (2). When the values of M and N are selected arbitrarily, there are two cases in which the M and N can satisfy the expression (2) and can not satisfy the expression (2). The examples are shown in FIG. 11, where a combination shown by a mark of "○" in the table indicates a case where each of the values M and N can meet conditions required in the expression (2). A combination shown by a mark of "x" in the table indicates a case where each of the values M and N cannot meet conditions required in the expression (2). That is, FIG. 11 indicates that, even if the values M and N satisfy the condition provided in the expression (2), there is a case where reading of the line is impossible, while, even if the values M and N do not satisfy the condition provided in the expression (2), there is a case where reading of the line is possible.

Moreover, if the reading operation by the CCD 1A starts from the first normal reading lines in this embodiment, subsequent reading operation is performed from a line existing by two pieces of reading lines forward in the sub-scanning direction and, as a result, omission of reading one normal reading lines (that is, one normal reading lines between A1 and B1 in FIG. 10) occurs, as in the case of the first embodiment, and therefore the reading operation should start from a line existing backward in a direction of sub-scanning by the number of reading lines determined based on the conditions M=3, N=2, and L=3. This situation occurs also when the reading operation is completed in a direction of sub-scanning in this embodiment, as in the case of the first embodiment. That is, the reading should be performed up to a line existing forward in the sub-scanning direction from the last normal reading lines by the number of reading lines determined based on the conditions M=3, N=2, and L=3.

Image signals 20-1, 20-2, and 20-3 (shown in FIG. 4) that have been read and output by the three line-like strings 2-1, 2-2, and 2-3 of light sensing devices are A/D converted by the A/D converting circuits 3-1, 3-2, and 3-3. Each of the A/D-converted pixel data of one reading line is stored in each of corresponding memory regions 6-1, 6-2, and 6-3. Operations in which the stored pixel data is read by the memory control circuit 12A and is fed to the image processing system through the interface 14 in this embodiment are the same as those in the case of the first embodiment. Detailed operations of the image reading apparatus of this embodiment are omitted accordingly.

FIG. 12 is an example of a case where the original document cannot be exactly read even in the second embodiment. The example is a case where M=3, N=6, and L=3. In the case of this combination of values M, N, and L, the original document cannot be read also in the first embodiment.

As described above, according to the image reading apparatus of the second embodiment, by setting the values M being the number of the line-like strings of light sensing devices, N being the interval among the line-like strings of light sensing devices represented by the number of reading lines and L being the moving speed represented by the number of reading lines that move for one line reading so that these values can satisfy the expression (2), M pieces of lines are simultaneously read in the sub-scanning direction and, every time the M pieces of lines have been read simultaneously, the original document is moved by L pieces of reading lines, thus implementing high-speed of reading of the original document. Thus, the same effects as obtained in the first embodiment can be achieved by the second embodiment.

Third Embodiment

Figure 13:
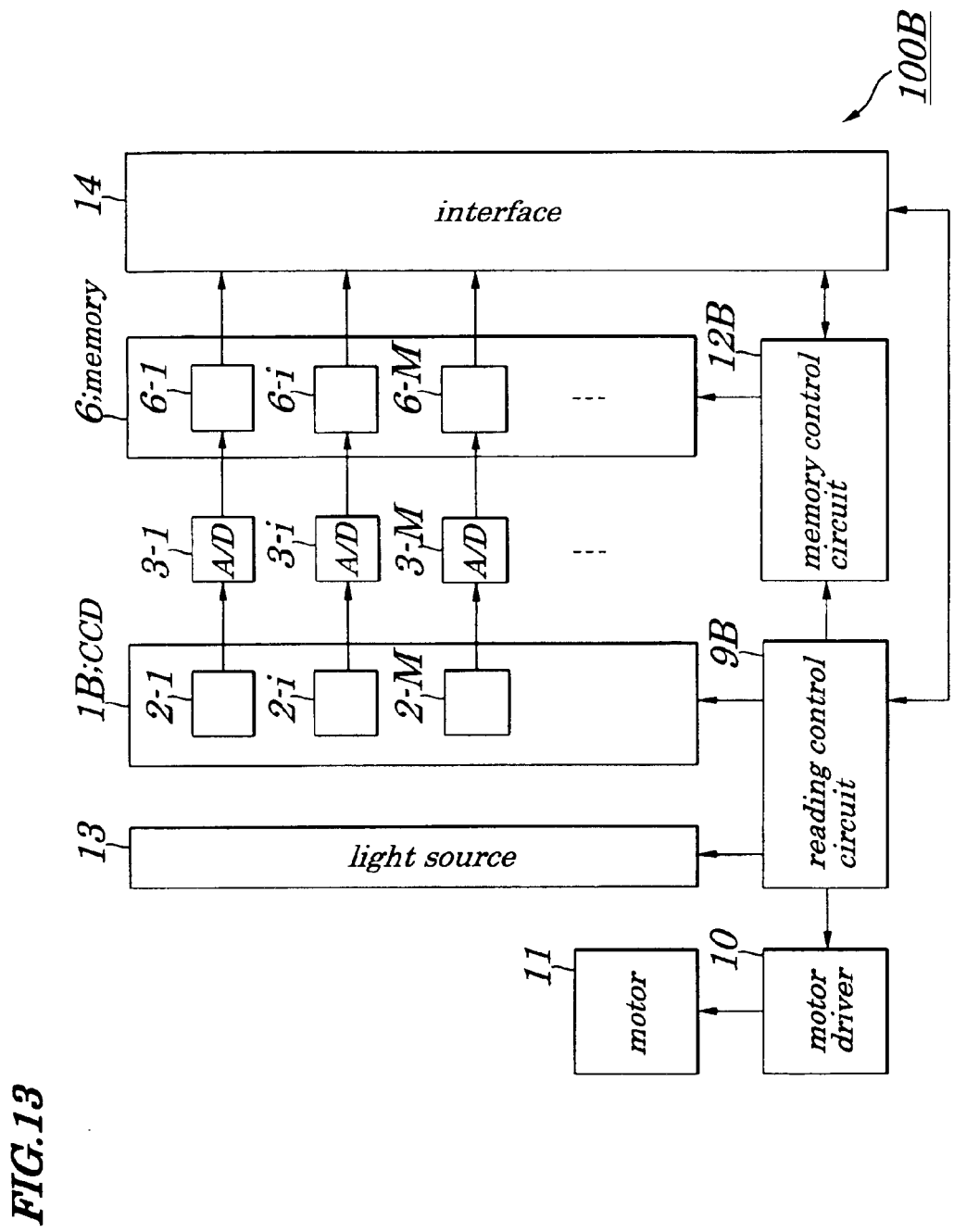
FIG. 13 is a schematic block diagram showing electrical configurations of an image reading apparatus according to a third embodiment of the present invention.
Figure 14:
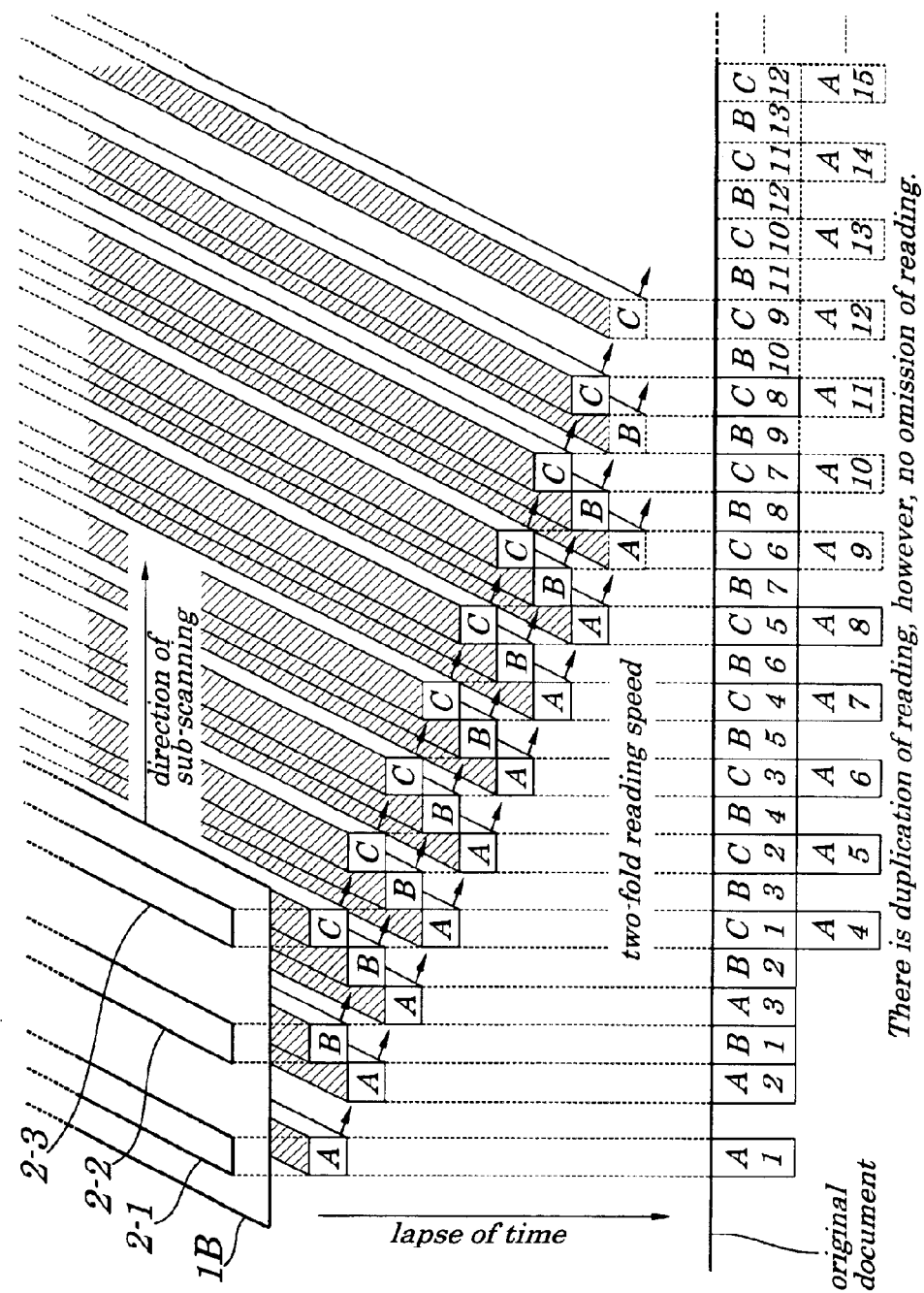
FIG. 14 is a diagram showing an example of a case where an original document can be read exactly by the image reading apparatus according to the third embodiment of the present invention.

FIG. 13 is a schematic block diagram showing electrical configurations of an image reading apparatus 100B of a third embodiment of the present invention. FIG. 14 is a diagram showing an example of a case where an original document can be read exactly by the image reading apparatus 100B. FIG. 15 is a table showing combinations of the number of line-like strings of light sensing devices and intervals among line-like strings of light sensing devices represented by numbers of reading lines in the image reading apparatus 100B.

Configurations of the image reading apparatus 100B of the third embodiment differ from those of the second embodiment in that, by using a CCD 1B with a plurality of line-like strings 2-1, 2-2, 2-3 of light sensing devices, an interval among which is represented by a predetermined number of reading lines, reading lines whose number being same as that of the line-like strings 2-1, 2-2, 2-3 of light sensing devices can be exactly read. That is, the number M of the line-like strings of light sensing devices, interval L among strings of light sensing devices and moving speed of L the reading lines (that is, distance to be moved for one line reading) are set so that M≧2, 1<L≦M and so that the greatest common measure of L and N is 1 (one). A series of these relations among M, N and L are referred to as an expression (3), In the third embodiment, in order to exactly read normal reading lines of the original document, a reading control circuit 9B and a memory control circuit 12B are operated by setting the values M and N and the value L being the moving speed represented by reading lines to be read by the CCD 1B so as to satisfy the above expression (3).

The configurations of this embodiment are based on the following understandings. That is, in the above third embodiment, if conditions provided in an expression (2) are met, efficient reading of the original document can be achieved. However, even if the values M, N, and L cannot meet the conditions provided in the above expression (2), only if the values M, N, and L can meet predetermined conditions, there can be values of M, N, and L that make it possible to normally read the original document, though efficiency of reading the original document is somewhat lowered. In this embodiment, the values M, N, and L are set so as to meet conditions provided in the expression (3).

Configurations of the image reading apparatus 100B of the third embodiment differ from those of the second embodiment in that the value of the moving speed L can satisfy the expression (3).

Configurations of the reading control circuit 9B of the third embodiment are the same as those of the second embodiment except for the following. That is, a motor control pulse MP (FIG. 5), which is produced every time one reading operation by the CCD 1B is completed in accordance with an instruction signal fed from an image processing system to which the image reading apparatus 100B is connected through an interface 14 (being equivalent to TG in FIG. 4), is adapted to move the original document at the moving speed L which has been set to satisfy the above expression (3).

Moreover, the original document is initially placed in a manner that reading operation starts from a line existing backward by specified numbers of reading lines determined based on values M, N, and L that can satisfy the expression (3) in a sub-scanning direction. Moving control by the reading control circuit 9B is started from the reading line positioned as above.

The reading control circuit 9B produces the motor control pulses MP every time the sequential one line reading operation is completed which reads from a last normal reading lines to a line existing immediately before a line positioned by specified numbers of reading lines determined based on the values M, N, and L that can satisfy the expression (3) forward in the sub-scanning line.

Configurations of the memory control circuit 12B of the third embodiment are the same as those of the second embodiment except that there are not stored in a memory region 6-$i$ both pixel data of lines read before the normal reading lines is read in accordance with the moving control by the reading control circuit 9B, by the line-like strings 2-1, 2-2, and 2-3 of light sensing devices, out of M pieces of line-like strings 2-1, 2-2, and 2-3 of light sensing devices making up the CCD 1B, existing in the foremost position in the sub-scanning direction and pixel data of lines read after the reading of the last normal reading lines has been completed.

Configurations other than described above are the same as those of the second embodiment and descriptions of them are omitted accordingly.

Next, operations of the image reading apparatus 100B of the third embodiment are described by referring to FIG. 13 to FIG. 15.

As in the case of the second embodiment, the number M of the line-like strings of light sensing devices is set to 3, the interval N among strings 2-1, 2-2, 2-3 of light sensing devices is set to 3 and the moving speed L of the reading lines (that is, a distance to be moved for one line reading) is set to 2. These values make up conditions provided by the expression (3). Here, each of the three line-like strings of light sensing devices is represented by the reference numbers 2-1, 2-2, and 2-3 (as shown in FIG. 14). Each of the image signals output from each of the line-like strings 2-1, 2-2, and 2-3 of light sensing devices is represented by the reference numbers 20-1, 20-2, and 20-3, respectively. Each of the three A/D converting circuits is represented by the reference numbers 3-1, 3-2, and 3-3. Each of the three memory regions is represented by 6-1, 6-2, and 6-3, respectively. Each of the line-like strings 2-1, 2-2, and 2-3 of light sensing is spaced by one piece of reading lines, that is, the interval among the line-like strings 2-1, 2-2, and 2-3 of light sensing devices is represented by the one piece of reading lines.

As described in the second embodiment, when the reading operation of the normal reading lines of the original document is completed, the motor control pulse MP is output from the reading control circuit 9B. The motor control pulse MP is fed to a motor driver 10 which produces a drive signal and feeds it to a motor 11. Therefore, the original document is moved by one normal reading lines in the direction of sub-scanning. As a result, the three line-like strings 2-1, 2-2, and 2-3 of light sensing devices making up the CCD 1B move from positions of the three normal reading lines that had been read before the original document was moved to positions of the three lines having been moved by one normal reading lines in the sub-scanning direction and reads the new three normal reading lines. Reading operations by the three line-like strings 2-1, 2-2, and 2-3 of light sensing are shown in FIG. 14. As shown in FIG. 14, in the example, no omission of reading occurs, but duplication of reading occurs (The reference number in FIG. 14 is the same as those in FIG. 6). The reading is twice faster than that of the conventional image reading apparatus.

In this embodiment, it is necessary to select values M, N, and L that can satisfy the expression (3). There are various combinations of the values M, N, and L that can satisfy the expression (3). That is, the most optimum combination among the values of M and N out of the values that can satisfy the expression (3) is "L=M". There is also a combination of the values M, N, and L out of the values satisfying the expression (3) that can be used in the reading operation if the moving speed is made slower. Moreover, there is a combination of the values M, N, and L that cannot satisfy the expression (3) unless L=1. Examples of the combination of the values M, N, and L are shown in FIG. 15. The combinations shown by the mark of "○" are examples of the most optimum combination of the values of M and N that can satisfy the expression (3). The combinations shown by the mark of "Δ" are examples of the combination of the values M, N, and L out of the values satisfying the expression (3) that can be used in the reading operation if the moving speed is made slower. The combination shown by the mark of "x" are examples of combinations of the values M and N that cannot satisfy the expression (3) unless L=1. Out of the combinations shown by the mark of "Δ", the combination of the moving speed L that can be used in the third embodiment is "1<1+L<1+M". The value L that can be used in this embodiment can be obtained by going up the column in FIG. 15 upward from a combination shown by the mark of "Δ" to a combination shown by the mark of "○" and then a value M corresponding to the combination shown by the mark of "Δ" is selected. For example, if M=6 and N=10, by making the speed slow so that L=3, the image reading apparatus 100B of this embodiment can be applied.

Moreover, if the reading operation by the CCD 1B starts from the first normal reading lines in this embodiment, subsequent reading operation is performed from a line existing by two pieces of reading lines forward in the sub-scanning direction and, as a result, the omission of reading one normal reading lines (see FIG. 14) occurs, as in the case of the second embodiment, and therefore the reading operation should start from a line existing backward in a direction of sub-scanning by the number of reading lines determined based on the conditions M=3, N=3, and L=2. This situation occurs also when the reading operation is completed in a direction of sub-scanning in this embodiment, as in the case of the second embodiment. That is, the reading should be performed up to a line existing forward in the sub-scanning direction from the last normal reading lines by the number of reading lines determined based on the conditions M=3, N=3, and L=2.

Every time sequential reading operations by the three line-like strings of light sensing devices are performed, the original document is fed to positions on the next reading lines in accordance with control of the reading control circuit 9B. The image signals 20-1, 20-2, and 20-3 output from the three line-like strings 2-1, 2-2, and 2-3 of light sensing devices are A/D converted by each of A/D converting circuits 3-1, 3-2, and 3—3 and then each of the A/D converted image data is stored by the memory control circuit 12B in each of the memory regions 6-1, 6-2 and 6-3.

Operations in which the stored pixel data is read by the memory control circuit 12B and is fed to the image processing system through the interface 14 in this embodiment are substantially the same as those in the case of the second embodiment. Moreover, the image reading apparatus of the third embodiment can be understood by referring to FIG. 14 in which examples of the conditions of M=3, N=3, and L=2 are used and by referring to the descriptions in the second embodiment and, therefore, detailed operations of the image reading apparatus 100B of this embodiment are omitted accordingly.

As in the case of the second embodiment, there is a case where the original document cannot be used even by using this operations in this embodiment. FIG. 12 shows an example in which the original document cannot be exactly read and in which M is 3, N is 6, and L is 3.

Thus, according to configurations of the third embodiment, by setting M being the number of line-like strings of light sensing devices making up the CCD 1B, N being the interval among the line-like strings of light sensing devices and L being the moving speed represented by the number of reading lines to meet the conditions provided by the expression (3) and by reading simultaneously M pieces of reading lines in the sub-scanning direction and by moving the original document by the number of reading lines every time M pieces of reading lines are read, the reading is made faster by M times or by times being smaller than M which is determined based on the relation among the values M, N, and L, compared with the conventional reading. The same effects as obtained in the first embodiment can be achieved accordingly.

Fourth Embodiment

Figure 16:
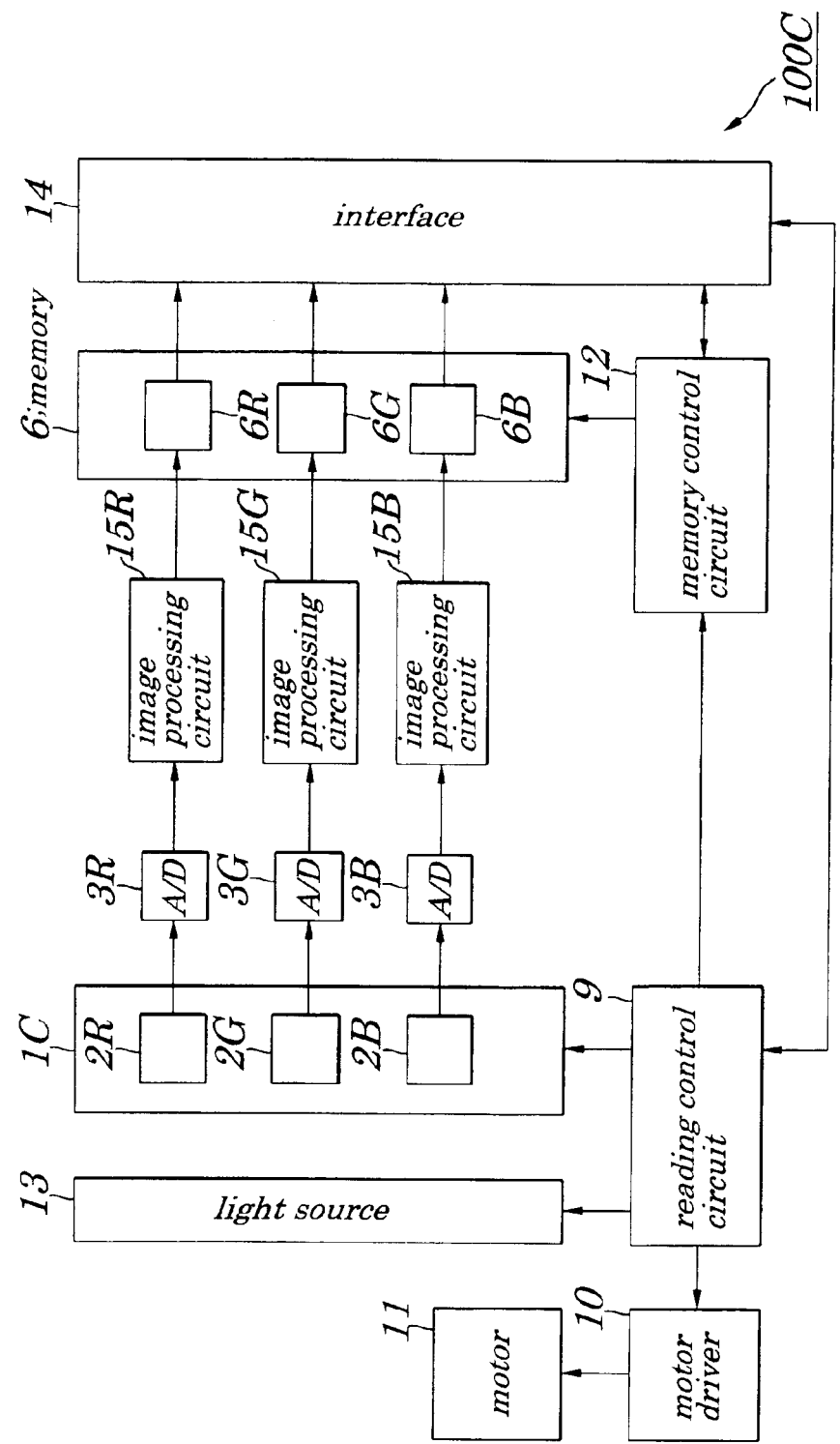
FIG. 16 is a schematic block diagram showing electrical configurations of an image reading apparatus according to a fourth embodiment of the present invention.
Figure 17:
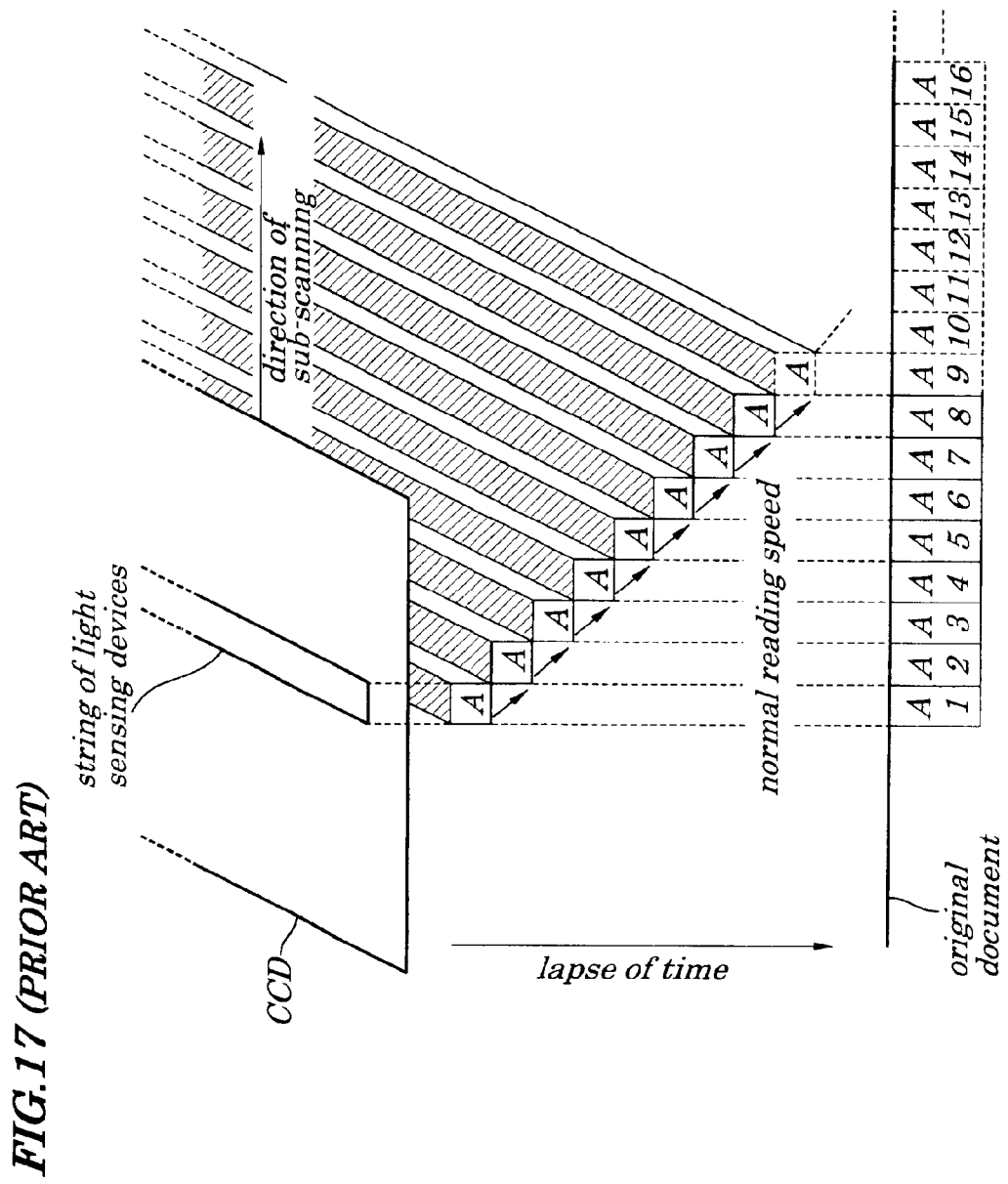
FIG. 17 is a table explaining operations of reading an original document by using a conventional image reading apparatus.

FIG. 16 is a schematic block diagram showing electrical configurations of an image reading apparatus 100C according to a fourth embodiment of the present invention.

Configurations of the image reading apparatus 100C of the fourth embodiment differ greatly from those of the first embodiment in that a color CCD 1C is made up of a color CCD. Therefore, the color CCD 1C has three line-like strings 2R, 2G, and 2B of light sensing devices. Each of A/D converting circuits 3R, 3G, and 3B is connected to each of the three line-like strings 2R, 2G, and 2B of light sensing devices. Each of memory regions 6R, 6G, and 6B makes up the memory 6. Each of image processing circuits 15R, 15G, and 15B is connected between each of the A/D converting circuits 3R, 3G, and 3B and each of the memory regions 6R, 6G, and 6B of a memory 6.

Since other configurations except those described above are the same as those in the first embodiment, same reference numbers are assigned to corresponding components and descriptions of them are omitted accordingly.

Next, operations of the image reading apparatus 100C of the embodiment will be described by referring to FIG. 16. Operations in which three reading lines are simultaneously and sequentially read by the three line-like strings 2R, 2G, and 2B of light sensing devices of the color CCD 1C and, after completion of the simultaneous reading, an original document is moved by specified numbers of reading lines forward in a sub-scanning direction are same as those in the first embodiment. Moreover, operations in which each of image signals output from the three line-like strings 2R, 2G, and 2B of light sensing devices is A/D converted to pixel data of one reading line by each of the A/D converting circuits 3R, 3G, and 3B are same as those in the first embodiment.

Gray levels of pixel data output from each of the A/D converting circuits 3R, 3G, and 3B are corrected by each of corresponding image processing circuits 15R, 15G, and 15B. A purpose of a gray level correction is to correct a difference occurring in reading image signals output from the line-like strings 2R, 2G, and 2B of light sensing devices because the original document is colored one and sensitivity of a color filter mounted on the color CCD 1C is different accordingly.

Operations in which pixel data obtained after the correction of gray levels by each of the image processing circuits 15R, 15G, and 15B is stored in each of the memory regions 6R, 6G, and 6B and stored image data is read are the same as those in the first embodiment.

By configuring the image reading apparatus 100C as described above, reading of both colored original documents and monochrome documents is made possible. Therefore, there is no need for using a specially fabricated CCD.

The reading of original documents is made three times faster than reading by a conventional image reading apparatus.

Moreover, the present invention can be applied to ordinary color scanners so long as enough memory capacities can be obtained. In particular, if moving speed is controllable, reading data from memory can be performed by using software processing.

It is apparent that the present invention is not limited to the above embodiments but may be changed and modified without departing from the scope and spirit of the invention. For example, though, in the above embodiments, the image reading apparatus is so configured that the CCD is fixed and the original document is moved, however, it can be configured so that the original document is fixed and the CCD is moved by a CCD moving unit, which can be a so-called "original document stationary-type scanner". In this case, an amount of movement of the CCD can be set to a same amount of movement of the original document as in the case where the original document is moved.

Moreover, in each of the above embodiments, the image reading apparatus is so configured that the CCD additionally reads a plurality of lines existing consecutively at a front end of the original document before it reads lines that have to be normally read in a front end portion and the CCD additionally reads a plurality of lines existing consecutively at a back end of the original document after it reads lines that have to be normally read in a back end portion. A memory control circuit 12 stops writing of data of lines that are not lines that have to be normally read and that exist at the front end of the original document, to memory regions 6-1, 6-2, and 6-3 and stops writing of data of lines that are not the lines that have to be normally read and that exist at the back end of the original document, to memory regions 6-1, 6-2, and 6-3. However, image signal that cannot be read immediately after a start of reading and image signal that cannot be read immediately before an end of reading may be interpolated by image signal that has been already read or image signal obtained from the line existing before or after the line that has been read. This can avoid a necessity of additional scanning. The image reading apparatus of the present invention can be constructed so that the above interpolation can be applied, within an acceptable limit of reduced quality of the image, to a case where omission of reading occurs as shown in FIG. 9.

Furthermore, in the above embodiments, to stop writing of data to the memory regions 6-1, 6-2, and 6-3, a writing stop signal is used, however, it is possible to stop writing of data to these memory regions by stopping operations of the A/D converting circuits.

What is claimed is:

1. An image reading apparatus for reading lines to be read on a surface of an original document in a sub-scanning direction and outputting image signals obtained by reading said lines to be read, comprising:
 a reading unit having light sensing devices that are able to simultaneously read M (said M is a natural number being not less than two) pieces of lines to be read which are said lines to be read existing on said surface of said original document and which are different lines in said sub-scanning direction, each existing apart by N (said N is a natural number being not less than two) pieces of lines in said sub-scanning direction;
 a moving unit to move one of said original document and said reading unit, every time said lines are simultaneously read, by L (said L is a natural number) pieces of said lines to be read, in said sub-scanning direction; and
 an image signal outputting unit to output said image signals of said lines to be read which have been read by said reading unit in order of reading in said sub-scanning direction;
 wherein values of said M, said N, and said L are set to values at which lines on said surface of said original document are able to be read without omission of reading lines when simultaneous and sequential reading operations are performed from a first line to be read to a last line to be read on said surface of said original document; and
 wherein values of said M, said N, and said L are set so that $M \geq 2$, $N > 1+M$, and $L = N-1$.

2. An image reading apparatus for reading lines to be read on a surface of an original document in a sub-scanning direction and outputting image signals obtained by reading said lines to be read, comprising:
 a reading unit having light sensing devices that are able to simultaneously read M (said M is a natural number being not less than two) pieces of lines to be read which are said lines to be read existing on said surface of said original document and which are different lines in said sub-scanning direction, each existing apart by N (said N is a natural number being not less than two) pieces of lines in said sub-scanning direction;
 a moving unit to move one of said original document and said reading unit, every time said lines are simultaneously read, by L (said L is a natural number) pieces of said lines to be read, in said sub-scanning direction; and
 an image signal outputting unit to output said image signals of said lines to be read which have been read by said reading unit in order of reading in said sub-scanning direction;
 wherein values of said M, said N, and said L are set to values at which lines on said surface of said original document are able to be read without omission of reading lines when simultaneous and sequential reading operations are performed from a first line to be read to a last line to be read on said surface of said original document; and
 wherein values of said M, said N, and said L are set so that $M \geq 2$, $1 < L < M$ and that a greatest common measure of values of said L and said N equals one.

3. The image reading apparatus according to claim 2, wherein values of said M and said L are set so that $1 < 1+L < 1+M$.

4. The image reading apparatus according to claim 1, wherein said image signal outputting unit includes:
 an analog to digital converting circuit to analog to digital convert image signals of M pieces of lines to be read which have been output from said reading unit;

a storing device to store pixel data obtained by conversion by said analog to digital converting circuit; and a reading control circuit to read said pixel data stored in said storing device in order of reading in said sub-scanning direction.

5. The image reading apparatus according to claim 4, wherein said reading unit starts said sequential reading operations from a line existing backward in said sub-scanning direction by a predetermined number of lines to be read that is determined based on values of said M, said N, and said L from said first line to be normally read and performs said sequential reading operations up to a line existing forward in said sub-scanning direction by said predetermined number of lines to be read that is determined based on values of said M, said N, and said L; and wherein said storing device stores only said pixel data obtained by reading lines to be normally read and output from said analog to digital converting circuit.

6. The image reading apparatus according to claim 5, wherein said reading unit comprises a color reading device; and wherein an image processing circuit for gray-level correction is provided between said storing device and said analog to digital converting circuit.

7. The image reading apparatus according to claim 2, wherein said image signal outputting unit includes:

an analog to digital convening circuit to analog to digital convert image signals of M pieces of lines to be read which have been output from said reading unit;

a storing device to store pixel data obtained by conversion by said analog to digital converting circuit; and a reading control circuit to read said pixel data stored in said storing device in order of reading in said sub-scanning direction.

8. The image reading apparatus according to claim 7, wherein said reading unit starts said sequential reading operations from a line existing backward in said sub-scanning direction by a predetermined number of lines to be read that is determined based on values of said M, said N, and said L from said first line to be normally read and performs said sequential reading operations up to a line existing forward in said sub-scanning direction by said predetermined number of lines to be read that is determined based on values of said M, said N, and said L; and wherein said storing device stores only said pixel data obtained by reading lines to be normally read and output from said analog to digital converting circuit.

9. The image reading apparatus according to claim 8, wherein said reading unit comprises a color reading device; and wherein an image processing circuit for gray-level correction is provided between said storing device and said analog to digital converting circuit.

10. An image reading method for reading lines to be read on a surface of an object to be read in a sub-scanning direction and for outputting image signals obtained by reading said lines to be read, comprising:

setting a number M of lines (said M is a natural number being not less than two) that have to be simultaneously read, an interval N (said N is a natural number being not less than two) among said lines that have to be simultaneously read and which is specified in terms of lines, and a number L of lines (said L is a natural number) by which each of said lines to be read moves from said lines whose reading has been completed every time simultaneous reading is completed, such that $M \geq 2$, $N > 1+M$, and $L = N-1$, and such that all of said lines to be read on said surface of said object to be read are able to be read when sequential reading operations are performed from a first line to be read to a last line to be read on said surface of said object to be read;

reading said lines to be read on said surface of said object to be read by moving said lines by L lines in a sub-scanning direction when said simultaneous reading of M lines has been completed and by repeating said simultaneous reading on subsequent lines to be read; and outputting said image signals obtained by reading said lines to be read.

11. The image reading method according to claim 10, wherein said first line to be read on said surface of said object is a line existing backward, from a first line to be normally read on said surface of said object, by a first predetermined number of lines to be read which is determined based on values of said M, said N, and said L, in said sub-scanning direction;

wherein said last line to be read is a line existing forward, from a last line to be normally read on said surface of said object, by a second predetermined number of lines to be read which is determined based on values of said M, said N, and said L, in said sub-scanning direction; and wherein said image signals of said lines to be read are image signals of said first line to be normally read to said last line to be normally read.

12. An image reading method for reading lines to be read on a surface of an object to be read in a sub-scanning direction and for outputting image signals obtained by reading said lines to be read, comprising:

setting a number M of lines (said M is a natural number being not less than two) that have to be simultaneously read, an interval N (said N is a natural number being not less than two) among said lines that have to be simultaneously read and which is specified in terms of lines, and a number L of lines (said L is a natural number) by which each of said lines to be read moves from said lines whose reading has been completed every time simultaneous reading is completed, such that $M \geq 2$, $1 < L < M$, and a greatest common measure of values of said L and said N equals one, and such that all of said lines to be read on said surface of said object to be read are able to be read when sequential reading operations are performed from a first line to be read to a last line to be read on said surface of said object to be read;

reading said lines to be read on said surface of said object to be read by moving said lines by L lines in a sub-scanning direction when said simultaneous reading of M lines has been completed and by repeating said simultaneous reading on subsequent lines to be read; and outputting said image signals obtained by reading said lines to be read.

13. The image reading method according to claim 12, wherein said first line to be read on said surface of said object is a line existing backward, from a first line to be normally read on said surface of said object, by a first predetermined number of lines to be read which is determined based on values of said M, said N, and said L, in said sub-scanning direction;

wherein said last line to be read is a line existing forward, from a last line to be normally read on said surface of said object, by a second predetermined number of lines to be read which is determined based on values of said M, said N, and said L, in said sub-scanning direction; and wherein said image signals of said lines to be read are image signals of said first line to be normally read to said last line to be normally read.

14. An image reading apparatus for reading lines to be read on a surface of a document in a sub-scanning direction and outputting image signals obtained by reading said lines to be read, comprising:

a reading means having light sensing devices for simultaneously reading M (said M is a natural number being not less than two) pieces of lines to be read which are said lines to be read existing on said surface of said document and which are different lines in said sub-scanning direction, each existing apart by N (said N is a natural number being not less than two) pieces of lines in said sub-scanning direction;

a moving means for moving one of said document and said reading means, every time said lines are simultaneously read, by L (said L is a natural number) pieces of said lines to be read, in said sub-scanning direction; and an image signal outputting means for outputting said image signals of said lines to be read which have been read by said reading means in order of reading in said sub-scanning direction;

wherein values of said M, said N, and said L are set so that $M \geq 2$, $N<1+M$, and $L=N-1$, and such that lines on said surface of said document are able to be read without omission of any of said lines to be read when sequential reading operations are performed from a first line to be read to a last line to be read on said surface of said document.

15. The image reading apparatus according to claim 14, wherein said image signal outputting means includes:

an analog to digital converting circuit to analog to digital convert image signals of M pieces of lines to be read which have been output from said reading means;

a storing device to store pixel data obtained by conversion by said analog to digital converting circuit; and a reading control circuit to read said pixel data stored in said storing device in order of reading in said sub-scanning direction.

16. The image reading apparatus according to claim 15, wherein said reading means starts said sequential reading operations from a line existing backward in said sub-scanning direction by a predetermined number of lines to be read that is determined based on values of said M, said N, and said L from said first line to be normally read and performs reading operations up to a line existing forward in said sub-scanning direction by said predetermined number of lines to be read that is determined based on values of said M, said N, and said L; and wherein said storing device stores only said pixel data obtained by reading lines to be normally read and output from said analog to digital converting circuit.

17. The image reading apparatus according to claim 16, wherein said reading means comprises a color reading device; and wherein an image processing circuit for gray-level correction is provided between said storing device and said analog to digital converting circuit.

18. An image reading apparatus for reading lines to be read on a surface of a document in a sub-scanning direction and outputting image signals obtained by reading said lines to be read, comprising:

a reading means having light sensing devices for simultaneously reading M (said M is a natural number being not less than two) pieces of lines to be read which are said lines to be read existing on said surface of said document and which are different lines in said sub-scanning direction, each existing apart by N (said N is a natural number being not less than two) pieces of lines in said sub-scanning direction;

a moving means for moving one of said document and said reading means, every time said lines are simultaneously read, by L (said L is a natural number) pieces of said lines to be read, in said sub-scanning direction; and an image signal outputting means for outputting said image signals of said lines to be read which have been read by said reading means in order of reading in said sub-scanning direction;

wherein values of said M, said N, and said L are set so that $M \geq 2$, $1<L<M$, and a greatest common measure of values of said L and said N equals one, and such that lines on said surface of said document are able to be read without omission of any of said lines to be read when sequential reading operations are performed from a first line to be read to a last line to be read on said surface of said document.

19. The image reading apparatus according to claim 18, wherein said image signal outputting means includes:

an analog to digital converting circuit to analog to digital convert image signals of M pieces of lines to be read which have been output from said reading means;

a storing device to store pixel data obtained by conversion by said analog to digital converting circuit; and a reading control circuit to read said pixel data stored in said storing device in order of reading in said sub-scanning direction.

20. The image reading apparatus according to claim 19, wherein said reading means starts said sequential reading operations from a line existing backward in said sub-scanning direction by a predetermined number of lines to be read that is determined based on values of said M, said N, and said L from said first line to be normally read and performs reading operations up to a line existing forward in said sub-scanning direction by said predetermined number of lines to be read that is determined based on values of said M, said N, and said L; and wherein said storing device stores only said pixel data obtained by reading lines to be normally read and output from said analog to digital converting circuit.

21. The image reading apparatus according to claim 20, wherein said reading means comprises a color reading device; and wherein an image processing circuit for gray-level correction is provided between said storing device and said analog to digital converting circuit.

* * * * *